United States Patent
Shamshiri et al.

(10) Patent No.: US 11,958,485 B2
(45) Date of Patent: Apr. 16, 2024

(54) VEHICLE CONTROL METHOD AND APPARATUS

(71) Applicant: JAGUAR LAND ROVER LIMITED, Coventry (GB)

(72) Inventors: Navid Shamshiri, Coventry (GB); Arun Raveendran, Coventry (GB); Robin Boyd, Bishops Tachbrook (GB)

(73) Assignee: Jaguar Land Rover Limited, Coventry (GB)

( * ) Notice: Subject to any disclaimer, the term of this patent is extended or adjusted under 35 U.S.C. 154(b) by 60 days.

(21) Appl. No.: 16/977,053

(22) PCT Filed: Jan. 9, 2019

(86) PCT No.: PCT/EP2019/050388
§ 371 (c)(1),
(2) Date: Aug. 31, 2020

(87) PCT Pub. No.: WO2019/166141
PCT Pub. Date: Sep. 6, 2019

(65) Prior Publication Data
US 2021/0001850 A1    Jan. 7, 2021

(30) Foreign Application Priority Data

Mar. 1, 2018  (IN) .............................. 201811007656
Mar. 1, 2018  (IN) .............................. 201811007658
(Continued)

(51) Int. Cl.
*B60W 30/165*    (2020.01)
*B60W 40/06*    (2012.01)

(52) U.S. Cl.
CPC .......... *B60W 30/165* (2013.01); *B60W 40/06* (2013.01); *B60W 2520/16* (2013.01); *B60W 2520/18* (2013.01); *B60W 2554/4041* (2020.02)

(58) Field of Classification Search
CPC .............. B60W 30/165; B60W 40/06; B60W 2520/16; B60W 2520/18;
(Continued)

(56) References Cited

U.S. PATENT DOCUMENTS 6,032,097 A    2/2000  Iihoshi et al.
9,381,811 B2 *  7/2016  Kondoh ................. B60K 31/18
(Continued)

FOREIGN PATENT DOCUMENTS

CN    104349926 A  *  2/2015  .......... B60W 30/143
CN    106060517 A  *  10/2016  ............ B60W 30/14
(Continued)

OTHER PUBLICATIONS

"Road Grade Estimation With Vehicle-Based Inertial Measurement Unit and Orientation Filter;" Jens Jauch, Johannes Masino, Tim Staiger, Frank Gauterin; IEEE Sensors Journal (vol. 18, Issue: 2, pp. 781-789); Jan. 26, 2018. (Year: 2018).*
(Continued)

*Primary Examiner* — Khoi H Tran
*Assistant Examiner* — Jorge O Peche
(74) *Attorney, Agent, or Firm* — Reising Ethington P.C.

(57) ABSTRACT

A control system (1) for controlling operation of a host vehicle (2). The control system (1) includes a controller (4) having a processor (5) and a memory (6). The processor (5) is operable to receive a signal (S1) from a sensor (7) and to process the signal (S1) to identify a target vehicle (3). The processor (5) determines a vertical offset ($\Delta V$) between the host vehicle (2) and the target vehicle (3). A target follow
(Continued)

distance (D1) may be set based on the determined vertical offset (ΔV). Also provided is a vehicle (1) incorporating the control system (1); a related method of controlling a vehicle (2); and a non-transitory computer-readable medium.

11 Claims, 9 Drawing Sheets

(30) Foreign Application Priority Data

| Mar. 1, 2018 | (IN) | 201811007661 |
|---|---|---|
| Apr. 24, 2018 | (GB) | 1806625 |
| Apr. 24, 2018 | (GB) | 1806627 |
| Apr. 24, 2018 | (GB) | 1806630 |

(58) Field of Classification Search
CPC ..... B60W 2554/4041; B60W 2554/00; B60W 40/076; B60W 30/16
See application file for complete search history.

(56) References Cited

U.S. PATENT DOCUMENTS

| | | | |
|---|---|---|---|
| 10,034,066 B2* | 7/2018 | Tran | B33Y 10/00 |
| 10,106,167 B2* | 10/2018 | Mohamed | G06T 7/70 |
| 10,131,355 B2* | 11/2018 | Takaso | B62D 15/00 |
| 10,506,200 B2* | 12/2019 | Stein | B60W 40/076 |
| 10,843,695 B2* | 11/2020 | Niino | B60W 30/16 |
| 10,928,830 B1* | 2/2021 | Tran | G06N 3/045 |
| 11,553,140 B2* | 1/2023 | Lu | B60R 1/00 |
| 2002/0026274 A1* | 2/2002 | Morizane | B60W 30/16 348/148 |
| 2002/0069010 A1* | 6/2002 | Nishira | B60W 30/16 701/96 |
| 2002/0161506 A1* | 10/2002 | Ishizu | B60W 30/16 701/96 |
| 2003/0218563 A1 | 11/2003 | Miyahara | |
| 2003/0234127 A1* | 12/2003 | Sudou | B60W 30/18145 180/170 |
| 2004/0094912 A1* | 5/2004 | Niwa | B60G 17/0165 280/5.518 |
| 2005/0128063 A1* | 6/2005 | Isaji | B60W 10/18 340/576 |
| 2005/0225478 A1* | 10/2005 | Nakamura | G01S 7/4802 356/28 |
| 2006/0080033 A1* | 4/2006 | Komatsu | G01C 21/30 701/448 |
| 2006/0139619 A1* | 6/2006 | Fujii | G06T 7/73 356/28 |
| 2006/0217879 A1* | 9/2006 | Ikeuchi | G01C 21/3844 701/409 |
| 2007/0025112 A1* | 2/2007 | Kuhl | B60Q 1/10 340/936 |
| 2007/0080583 A1* | 4/2007 | Noumura | B60T 8/17616 303/175 |
| 2007/0100532 A1* | 5/2007 | Miyajima | B60G 17/00 701/93 |
| 2008/0013790 A1* | 1/2008 | Ihara | G06V 20/56 382/104 |
| 2008/0062010 A1* | 3/2008 | Kobayashi | G08G 1/167 340/937 |
| 2009/0097038 A1* | 4/2009 | Higgins-Luthman | B60G 17/019 356/602 |
| 2009/0135049 A1 | 5/2009 | Kikuchi | |
| 2010/0020170 A1* | 1/2010 | Higgins-Luthman | B60W 30/16 348/135 |
| 2010/0152967 A1* | 6/2010 | Murphy | B60W 40/06 701/300 |
| 2010/0182199 A1* | 7/2010 | Jeong | G01S 7/4026 342/374 |
| 2010/0222959 A1* | 9/2010 | Murata | B60W 10/184 701/31.4 |
| 2010/0222960 A1* | 9/2010 | Oida | B60N 2/501 701/31.4 |
| 2013/0024084 A1 | 1/2013 | Yamashiro | |
| 2013/0113615 A1* | 5/2013 | Jin | G07C 5/0825 340/439 |
| 2013/0141580 A1* | 6/2013 | Stein | G06V 20/58 348/148 |
| 2013/0166149 A1* | 6/2013 | Liu | B60G 17/015 701/37 |
| 2014/0062762 A1* | 3/2014 | Kurono | G01S 7/354 342/146 |
| 2014/0067154 A1* | 3/2014 | Yu | B60W 40/076 701/1 |
| 2014/0161323 A1* | 6/2014 | Livyatan | G06T 7/579 382/107 |
| 2015/0086080 A1* | 3/2015 | Stein | H04N 7/183 382/104 |
| 2015/0120153 A1 | 4/2015 | Heim | |
| 2015/0253426 A1* | 9/2015 | Yasugi | G01S 17/08 356/4.07 |
| 2015/0307099 A1* | 10/2015 | Dextreit | B60W 30/18127 180/65.265 |
| 2015/0307100 A1 | 10/2015 | Shimizu et al. | |
| 2015/0314790 A1* | 11/2015 | Deragarden | B60Q 9/008 703/8 |
| 2015/0336546 A1* | 11/2015 | Al-Zahrani | G01S 17/08 701/93 |
| 2015/0344033 A1* | 12/2015 | Fukuda | B60W 30/16 701/117 |
| 2015/0344034 A1* | 12/2015 | Niino | B60W 30/16 701/96 |
| 2015/0375744 A1 | 12/2015 | Kato et al. | |
| 2016/0073214 A1* | 3/2016 | Shiozawa | G10K 15/00 381/302 |
| 2016/0093210 A1* | 3/2016 | Bonhomme | G08G 1/0141 340/905 |
| 2016/0252613 A1* | 9/2016 | Suarez | G01S 13/931 342/70 |
| 2016/0253566 A1* | 9/2016 | Stein | G06T 7/13 348/148 |
| 2016/0318365 A1* | 11/2016 | Sivaraman | G01S 17/88 |
| 2016/0325753 A1* | 11/2016 | Stein | G05D 1/0251 |
| 2017/0008521 A1* | 1/2017 | Braunstein | B60W 40/06 |
| 2017/0043771 A1* | 2/2017 | Ibanez-Guzman | G01S 13/865 |
| 2017/0129535 A1* | 5/2017 | You | B62D 6/002 |
| 2017/0137023 A1* | 5/2017 | Anderson | B60W 10/20 |
| 2017/0270372 A1* | 9/2017 | Stein | G06T 7/60 |
| 2018/0038952 A1* | 2/2018 | Shokonji | G01S 17/86 |
| 2018/0067206 A1* | 3/2018 | Matsunaga | B60T 7/12 |
| 2018/0222480 A1* | 8/2018 | Shokonji | B60W 30/17 |
| 2018/0342160 A1* | 11/2018 | Komori | B60T 8/171 |
| 2019/0079539 A1* | 3/2019 | Sridhar | G01C 21/30 |
| 2019/0232748 A1* | 8/2019 | Mohamed | B60G 17/0165 |
| 2019/0263210 A1* | 8/2019 | Nasu | B60W 40/10 |
| 2019/0317527 A1* | 10/2019 | Tan | B64C 39/024 |
| 2019/0325595 A1* | 10/2019 | Stein | G06T 7/248 |
| 2020/0086864 A1* | 3/2020 | Rajendra Zanpure | G06T 7/70 |
| 2020/0207344 A1* | 7/2020 | Ishioka | B60W 30/18018 |
| 2020/0254995 A1* | 8/2020 | Lee | G01S 13/87 |
| 2020/0255234 A1* | 8/2020 | Sveum | B65G 69/003 |
| 2020/0262477 A1* | 8/2020 | Hirao | B60G 15/02 |
| 2020/0369269 A1* | 11/2020 | Tanaka | G08G 1/096791 |
| 2021/0001850 A1* | 1/2021 | Shamshiri | B60W 30/165 |
| 2021/0094542 A1* | 4/2021 | Horiguchi | B60T 7/042 |
| 2021/0172744 A1* | 6/2021 | Raut | G06N 5/04 |
| 2021/0264170 A1* | 8/2021 | Wranne | G06V 20/58 |
| 2021/0271997 A1* | 9/2021 | Raut | G06N 20/00 |
| 2021/0316727 A1* | 10/2021 | Aizawa | B60W 40/105 |
| 2021/0370937 A1* | 12/2021 | Park | B60W 30/09 |
| 2021/0374976 A1* | 12/2021 | Lee | G06T 7/60 |
| 2022/0017089 A1* | 1/2022 | Aikawa | B60K 31/0008 |
| 2022/0041159 A1* | 2/2022 | Kim | B60W 40/13 |
| 2022/0097715 A1* | 3/2022 | Sumikawa | B60W 50/14 |

(56) References Cited

U.S. PATENT DOCUMENTS

| | | | | |
|---|---|---|---|---|
| 2022/0105934 A1* | 4/2022 | Shieh | | G06V 20/584 |
| 2022/0126855 A1* | 4/2022 | Bartels | | B60W 30/08 |
| 2022/0185287 A1* | 6/2022 | Kang | | B60W 30/0956 |

FOREIGN PATENT DOCUMENTS

| | | | | | |
|---|---|---|---|---|---|
| CN | 107351825 | B | * | 10/2019 | B60K 28/16 |
| CN | 113306559 | A | * | 8/2021 | G06K 9/00798 |
| DE | 102006038160 | A1 | | 4/2007 | |
| DE | 102015209955 | A1 | * | 12/2015 | B60W 30/16 |
| EP | 1872997 | A1 | | 1/2008 | |
| EP | 2958054 | A2 | * | 12/2015 | G06K 9/00798 |
| GB | 2390440 | A | | 1/2004 | |
| GB | 2571585 | A | * | 9/2019 | B60W 31/00 |
| GB | 2571586 | A | * | 9/2019 | B60W 10/20 |
| GB | 2571587 | A | * | 9/2019 | B60W 30/165 |
| GB | 2571588 | A | * | 9/2019 | B60W 40/06 |
| GB | 2571589 | A | * | 9/2019 | B60W 10/04 |
| GB | 2571590 | A | * | 9/2019 | B60W 30/16 |
| JP | H10300854 | A | * | 11/1998 | |
| JP | 2002114117 | A | * | 4/2002 | |
| JP | 2004255999 | A | * | 9/2004 | |
| JP | 2004317323 | A | * | 11/2004 | |
| JP | 2004333440 | A | * | 11/2004 | |
| JP | 2005186813 | A | * | 7/2005 | B60K 31/0008 |
| JP | 2006036159 | A | | 2/2006 | |
| JP | 2006036159 | A | * | 2/2006 | |
| JP | 3775200 | B2 | * | 5/2006 | |
| JP | 2006146372 | A | * | 6/2006 | G01S 17/42 |
| JP | 2010234987 | A | * | 10/2010 | |
| JP | 2012088217 | A | * | 5/2012 | |
| JP | 2015102932 | A | * | 6/2015 | |
| JP | 6417098 | B2 | * | 10/2018 | |
| JP | 2019079182 | A | * | 5/2019 | B60W 10/20 |
| JP | 2019532265 | A | * | 11/2019 | |
| JP | 2020071122 | A | * | 5/2020 | B60W 40/06 |
| JP | 6743507 | B2 | * | 8/2020 | |
| JP | 6766234 | B2 | * | 10/2020 | |
| JP | 6838525 | B2 | * | 3/2021 | B60W 31/00 |
| JP | 2021513062 | A | * | 5/2021 | |
| WO | WO-2007102228 | A1 | * | 9/2007 | B60W 30/095 |
| WO | WO-2013139966 | A1 | * | 9/2013 | B60W 30/143 |
| WO | WO2015045496 | A1 | | 4/2015 | |
| WO | WO-2015119298 | A1 | * | 8/2015 | G01S 13/86 |
| WO | WO-2019166141 | A1 | * | 9/2019 | B60K 31/00 |
| WO | WO-2019166142 | A1 | * | 9/2019 | B60W 10/20 |
| WO | WO-2020126480 | A1 | * | 6/2020 | B60G 17/00 |

OTHER PUBLICATIONS

"Vehicle Detection and Tracking in Car Video Based on Motion Model;" A Jazayeri, Hongyuan Cai, Jiang Yu Zheng, Mihran Tuceryan; IEEE Transactions on Intelligent Transportation Systems (vol. 12, Issue: 2, pp. 583-595); Jun. 30, 2012. (Year: 2012).*

International Search report corresponding to International Application No. PCT/EP2019/050388, dated Jun. 19, 2019, 4 pages.

Written Opinion corresponding to International Application No. PCT/EP2019/050388, dated Jun. 19, 2019, 10 pages.

Combined Search and Examination Report corresponding to GB Application No. GB1806625.8, dated Oct. 19, 2018, 6 pages.

Combined Search and Examination Report corresponding to GB Application No. GB1806630.8, dated Oct. 18, 2018, 6 pages.

Combined Search and Examination Report corresponding to GB Application No. GB1806627.4, dated Oct. 25, 2018, 9 pages.

Great Britain Office Action corresponding to GB Application No. GB1806625.8, dated Jun. 12, 2020, 3 pages.

* cited by examiner

VEHICLE CONTROL METHOD AND APPARATUS

TECHNICAL FIELD

The present disclosure relates to a vehicle control method and apparatus. In particular, but not exclusively, the present disclosure relates to a control apparatus and method for a host vehicle. The control apparatus and method identify a target vehicle and determine a vertical offset between the host vehicle and the identified target vehicle. The host vehicle may be controlled in dependence on the determined vertical offset.

BACKGROUND

It is known to provide a host vehicle with a control system to maintain a distance to another vehicle on a road, for example in a traffic jam or at higher speeds. The known systems generally operate by determining a distance to the other (target) vehicle, either measured as a length or as a function of time, based on the current road speed. In an off-road scenario, inclined slopes and gradients are often encountered. As the surface of the slope may be variable or low traction it is bad practice to follow a target vehicle onto a hill before they have completed the ascent or descent. If a vehicle is engaged in a follow mode and the target vehicle begins an ascent or descent, it would be desirable for the host vehicle not to follow the target vehicle. However, existing control systems which seek to maintain a defined distance to the target vehicle are unable to identify when these scenarios arise.

SUMMARY OF THE INVENTION

Aspects of the present invention relate to a control system, a vehicle; a method and a non-transitory computer-readable medium as claimed in the appended claims.

According to a further aspect of the present invention there is provided a control system for controlling operation of a host vehicle, the host vehicle being a land vehicle; wherein the control system comprises: a processor for receiving a signal from sensing means, the processor being operable to process the signal to identify a target vehicle which is a land vehicle; and to determine a vertical offset between the host vehicle and the target vehicle. The target vehicle may be in front of the host vehicle. The target vehicle may, for example, be the vehicle in front of the host vehicle in a convoy or may be a lead vehicle in a convoy. The host vehicle may be a following vehicle (i.e. a vehicle which is following the target vehicle). By tracking the vertical offset between the host vehicle and the target vehicle, the processor may determine a rate of ascent/decent of the target vehicle. The rate of ascent/descent may be indicative of the gradient. In certain embodiments, the processor may establish a location where the slope begins. The processor may implement an appropriate control strategy for the host vehicle. The control strategy may include, for example, continuing to follow the target vehicle (for example if a relatively shallow gradient is detected), or waiting at the base or crest of the gradient for a driver confirmation to proceed. It may also be possible in some cases to establish if the target vehicle has cleared the crest or base of the hill and it may therefore be appropriate to hold the host vehicle until this has been established before automatically resuming to follow.

The control system has particular application in an off-road scenario when the host vehicle is travelling on an unmetalled surface. However, it should be understood that aspect of the present invention may also be relevant to on-road scenarios, for example when the host vehicle is travelling on a highway or other metalled surface. The controller may be operable to control operation of the host vehicle in dependence on the determined vertical offset. By way of example, the controller may be operable to adjust a target follow distance in dependence on the determined vertical offset. The target follow distance represents a target distance to be maintained between the host vehicle and the detected target vehicle.

The sensing means may be operable to establish a detection region in front of the host vehicle. The sensing means could be remote from the host vehicle, for example on a drone vehicle. Alternatively, the sensing means may be provided on the host vehicle. The sensing means may be arranged in a forward-facing orientation on said host vehicle. The sensing means may comprise at least one sensor. The sensing means may comprise at least one optical sensor.

The processor may be operable to determine a rate of change of the determined vertical offset. The processor may be operable to identify a base of an incline and/or a crest of an incline in dependence on the rate of change of the determined vertical offset. A change in the rate of change of the determined vertical offset may indicate that the target vehicle has started to ascend or descend an incline; or may indicate that the target vehicle has completed the ascent or descent of the incline. The processor may be operable to determine when the rate of change of the vertical offset decreases below a first threshold value; and/or to determine when the rate of change of the vertical offset increases above a second threshold value.

The processor may be operable to record an ascent conclusion position of the target vehicle when the rate of change of the vertical offset decreases below said first threshold value. The ascent conclusion position may correspond to a crest of an incline or the base of an incline. The processor may be operable to record an ascent/descent commencement position when the rate of change of the vertical offset increases above said second threshold value. The ascent commencement position may correspond to a base of an incline or the top of an incline.

The processor may be operable to set a target follow distance between the host vehicle and the target vehicle. The target follow distance may be set in dependence on the determined vertical offset between the host vehicle and the target vehicle.

The processor may be operable to track an ascent/descent route of the target vehicle. The processor may translate the ascent/descent route onto a map, for example using GPS positioning technology. The processor may determine the elevation of the target vehicle along said ascent/descent route. The processor may be operable to assess one or more terrain characteristics in dependence on the elevation of the target vehicle and/or the determined vertical offset.

The processor may be operable to calculate a speed of the target vehicle along said ascent/descent route. The processor may optionally assess one or more terrain characteristics in dependence on the determined speed of the target vehicle. The processor may be operable to generate a location-based history of the speed of the target vehicle.

The one or more terrain characteristics may include an incline angle. The incline angle may be determined based on changes in the vertical offset. The processor may determine the incline angle in dependence on the tracked position of the target vehicle and/or a change in the vertical offset. The incline angle may be determined based on the rate of change of the vertical offset.

The signal received by the processor may be generated by one or more image sensors. The signal may comprise image data. The processor may be operable to process said image data to identify the target vehicle. The signal could be received from a remote sensor, for example installed in a drone or targeting system. The processor may be operable to process said image data to determine a pitch angle and/or a roll angle and/or a yaw angle of the target vehicle.

The processor may be operable to determine the vertical offset between the host vehicle and the target vehicle in dependence on a pitch angle and/or a roll angle of the host vehicle. The processor may compensate for the pitch angle and/or the roll angle of the host vehicle when determining the vertical offset.

The processor may be operable to output a host vehicle control signal in dependence on the determined vertical offset. The host vehicle control signal may comprise a signal to halt the host vehicle; and/or to set a target speed of the host vehicle. The host vehicle control signal may be operable to bring the host vehicle to a halt at a determined location. The location may be a determined ascent or descent commencement position determined by the processor in dependence on a rate of change in the vertical offset.

According to a further aspect of the present invention there is provided a control system for controlling operation of a host vehicle, the host vehicle being a land vehicle; wherein the control system comprises:
  a controller comprising a processor and a memory device, the processor having an input for receiving a signal from at least one sensor, the processor being operable to execute a set of instructions stored on the memory device;
  wherein, when executed, said instructions cause the processor to:
  process the signal from said at least one sensor to identify a target vehicle which is a land vehicle; and
  determine a vertical offset between the host vehicle and the target vehicle.

According to a further aspect of the present invention there is provided a vehicle comprising a control system as claimed in any one of the preceding claims. The vehicle may comprise a sensing means for generating said signal. The sensing means may comprise one or more optical sensor is mounted to the vehicle.

According to a further aspect of the present invention which protection is sought, there is provided a method of controlling operation of a host vehicle, the host vehicle being a land vehicle; wherein the method comprises:
  receiving a signal from sensing means;
  processing the signal to identify a target vehicle which is a land vehicle; and
  determining a vertical offset between the host vehicle and the target vehicle. The target vehicle may be in front of the host vehicle. The target vehicle may, for example, be the vehicle in front of the host vehicle in a convoy or may be a lead vehicle in a convoy. The host vehicle may be a following vehicle (i.e. a vehicle which is following the target vehicle). By determining the vertical offset between the host vehicle and the target vehicle, a rate of ascent/decent of the target vehicle may be determined.

The sensing means may be provided on the host vehicle.

The method may comprise determining a rate of change of the determined vertical offset. The method may comprise identifying a base of an incline and/or a crest of an incline in dependence on the rate of change of the determined vertical offset.

The method may comprise determining when the rate of change of the vertical offset decreases below a first threshold value; and/or determining when the rate of change of the vertical offset increases above a second threshold value. The method may comprise recording an ascent or descent commencement position.

The method may comprise setting a target follow distance between the host vehicle and the target vehicle in dependence on the determined vertical offset between the host vehicle and the target vehicle.

The method may comprise tracking an ascent/descent route of the target vehicle. The ascent/descent route may be recorded.

The method may comprise assessing one or more terrain characteristics in dependence on the determined vertical offset and the ascent/descent route of the target vehicle. The one or more terrain characteristics may include an incline angle. The method may comprise determining the incline angle based on a rate of change of the vertical offset.

The method may comprise estimating a speed of the target vehicle along said ascent/descent route; and optionally assessing one or more terrain characteristics in dependence on the determined speed of the target vehicle. The method may comprise generating a location-based speed history of the target vehicle.

The sensing means may comprise an image sensor. The signal may comprise image data. The method may comprise processing said image data to identify the target vehicle. The method may comprise processing said image data to determine a pitch angle and/or a roll angle and/or a yaw angle of the target vehicle.

The method may comprise determining the vertical offset between the host vehicle and the target vehicle in dependence on a pitch angle and/or a roll angle of the host vehicle.

The method may comprise setting a speed of the host vehicle in dependence on the determined vertical offset between the host vehicle and the target vehicle. The method may comprise outputting a host vehicle control signal in dependence on the determined vertical offset. The host vehicle control signal may comprise a signal to halt the host vehicle; and/or to adjust a speed of the host vehicle.

According to a further aspect of the present invention there is provided a target object tracking system for a vehicle, the target object tracking system comprising:
  a processor for receiving image data captured by one or more sensor disposed on the vehicle, wherein the processor is configured to:
    analyse the image data to identify image components;
    determine a movement vector of each image component, the movement vectors each comprising a magnitude and a direction;
    classify at least one of the image components as a target image component relating to the target object and at least one of the remaining image components as a non-target image component;
    modify the movement vector of the at least one target image component in dependence on the movement vector of the or each non-target image component; and
    track the target object in dependence on the modified movement vector of the at least one target image component.

The non-target image component may correspond to a static or stationary feature. The target object tracking system modifies the movement vector of the at least one target image component in dependence on the movement vectors of the non-target image components. At least in certain embodiments, this modification may at least partially correct for changes in the position and/or orientation of the sensing means, for example as a result of movements of the vehicle. Applying this correction to any potential target image components may improve the object detection system, for example over a rough surface. The modified movement vector may provide more accurate positioning information of the target object relative to the vehicle.

The processor may be configured to form at least a first set of said non-target image components. The first set may comprise a plurality of said non-target image components identified as having movement vectors in a first direction. The processor may form said first set by comparing the movement vectors of the image components and identifying at least one image component having a first movement vector comprising a first direction and/or a first magnitude. The processor may be configured to compare a rate of change of the movement vectors of the image components. For example, the processor may compare the rate of change of the magnitude and/or the direction of the movement vectors. The processor may be configured to identify at least one image component having a first movement vector comprising a first direction changing at a first rate and/or a first magnitude changing at a first rate. Thus, the first set may be formed of non-target image components having at least substantially the same direction.

The processor may be configured to compare the magnitude of the movement vectors of the non-target image components. The non-target image components in the first set may have substantially the same magnitude. Thus, the first set may be formed of non-target image components having at least substantially the same magnitude.

The processor may be configured to determine a correction factor in dependence on the movement vector of the non-target image components in said first set. Alternatively, or in addition, the processor may be configured to modify the movement vector of the at least one target image component by subtracting the movement vector of the non-target image components in said first set.

The processor may be configured to identify image components which are spatially separated from each other. For example, the processor may be configured to identify image components that are distal from each other within the image.

The image data may be video image data captured by one or more image sensors disposed on the vehicle. The processor may be configured to identify the or each image component as a persistent image component. A persistent image component is an image component which may be identified for a predetermined period of time, for example over successive frames of the video image.

The target object tracking system may be configured to track a moving target object. The target object may be a pedestrian or cyclist, for example. Alternatively, the target object may be a target vehicle. The target vehicle may be a wheeled vehicle, such as an automobile.

According to a further aspect of the present invention there is provided a vehicle comprising a target object acquisition system as described herein. The vehicle may comprise sensing means for generating the image data. The sensing means may comprise one or more image sensors, such as a camera. The vehicle may be a wheeled vehicle, such as an automobile.

According to a further aspect of the present invention there is provided a method of tracking a target object from a vehicle in dependence on image data captured by one or more sensor disposed on the vehicle; wherein the method comprises:
  analysing the image data to identify image components;
  determining a movement vector of each image component, the movement vectors each comprising a magnitude and a direction;
  classifying at least one of the image components as a target image component relating to the target object and at least one of the remaining image components as a non-target image component;
  modifying the movement vector of the at least one target image component in dependence on the movement vector of the or each non-target image component; and
  tracking the target object in dependence on the modified movement vector of the at least one target image component.

The non-target image component may correspond to a static or stationary feature. The method may comprise forming at least a first set of said non-target image components. The first set may comprise a plurality of said non-target image components identified as having movement vectors in a first direction. The method may comprise forming said first set by comparing the movement vectors of the image components. The method may comprise identifying at least one image component having a first movement vector comprising a first direction and/or a first magnitude. The method may comprise forming said first set by comparing the rate of change of the movement vectors of the image components. For example, the method may comprise comparing the rate of change of the magnitude and/or the direction of the movement vectors. The method may comprise identifying at least one image component having a first movement vector comprising a first direction changing at a first rate and/or a first magnitude changing at a first rate.

The method may comprise comparing the magnitude of the movement vectors of the non-target image components. The non-target image components in the first set may have substantially the same magnitude.

The method may comprise modifying the movement vector of the at least one target image component comprises subtracting the movement vector of the non-target image components in said first set.

The method may comprise identifying image components in the image data which are spatially separated from each other.

The image data may be video image data captured by one or more image sensors disposed on the vehicle; and the or each image component is a persistent image component. A persistent image component is an image component which may be identified for a predetermined period of time, for example over successive frames of the video image.

The method may comprise tracking a moving target object. The target object may be a pedestrian or cyclist, for example. Alternatively, the target object may be a target vehicle. The target vehicle may be a wheeled vehicle, such as an automobile.

According to a further aspect of the present invention there is provided a non-transitory computer-readable medium having a set of instructions stored therein which, when executed, cause a processor to perform the method(s) described herein.

According to a further aspect of the present invention there is provided a target object acquisition system for a vehicle, the target object acquisition system comprising:

a processor for receiving image data captured by one or more sensor disposed on the vehicle, wherein the processor is configured to:
analyse the image data to identify image components;
determine a movement vector of each identified image component, the movement vectors each having a magnitude and a direction;
form a first set comprising a plurality of said image components having a first movement vector, and classifying the image components in said first set as non-target image components;
form a second set comprising an image component having a second movement vector, the second movement vector being different from the first movement vector, and classifying the or each image component in said second set as a target image component relating to the target object; and
acquire the target object in dependence on the target image component in said second set.

The non-target image component may correspond to a static or stationary feature. The first set may comprise a plurality of image components; and the second set consists of a single image component.

The processor may form said first set by comparing the movement vectors of the image components and identifying at least one image component having a first movement vector comprising a first direction and/or a first magnitude. The processor may be configured to compare a rate of change of the movement vectors of the image components. For example, the processor may compare the rate of change of the magnitude and/or the direction of the movement vectors. The processor may be configured to identify at least one image component having a first movement vector comprising a first direction changing at a first rate and/or a first magnitude changing at a first rate.

The processor may form said second set by comparing the movement vectors of the image components and identifying at least one image component having a second movement vector comprising a second direction and/or a second magnitude. The processor may be configured to compare a rate of change of the movement vectors of the image components. For example, the processor may compare the rate of change of the magnitude and/or the direction of the movement vectors. The processor may be configured to identify at least one image component having a second movement vector comprising a second direction changing at a first rate and/or a second magnitude changing at a first rate.

The first direction and the second direction may be different from each other; and/or the first magnitude and the second magnitude may be different from each other.

The image components identified in the image data may be spatially separated from each other. For example, the processor may be configured to identify image components that are distal from each other within the image.

The techniques described herein for correcting the movement vector of the at least one target image component are applicable to the target object acquisition system. The processor may be configured to modify the movement vector of the at least one target image component in dependence on the movement vector of the or each non-target image component.

The image data may be video image data captured by one or more image sensors disposed on the vehicle. The or each image component may be a persistent image component. A persistent image component is an image component which may be identified for a predetermined period of time, for example over successive frames of the video image.

The processor may be configured to acquire a moving target object. The target object may be a pedestrian or cyclist, for example. Alternatively, the target object may be a target vehicle. The target vehicle may be a wheeled vehicle, such as an automobile.

According to a further aspect of the present invention there is provided a vehicle comprising a target object tracking system as described herein. The vehicle may comprise sensing means for generating the image data. The sensing means may comprise one or more image sensors, such as a camera. The vehicle may be a wheeled vehicle, such as an automobile.

According to a further aspect of the present invention there is provided a method of acquiring a target object from a vehicle in dependence on image data captured by one or more sensor disposed on the vehicle; wherein the method comprises:
analysing the image data to identify image components;
determining a movement vector of each identified image component, the movement vectors each having a magnitude and a direction;
forming a first set comprising a plurality of said image components having a first movement vector, and classifying the image components in said first set as non-target image components;
forming a second set comprising an image component having a second movement vector, the second movement vector being different from the first movement vector, and classifying the or each image component in said second set as a target image component relating to the target object; and
acquire the target object in dependence on the target image component in said second set.

The non-target image component may correspond to a static or stationary feature. The first set may comprise a plurality of image components. The second set may consist of a single image component.

The method may comprise forming said first set by comparing the movement vectors of the image components. The method may comprise identifying at least one image component having a first movement vector comprising a first direction and/or a first magnitude. The method may comprise forming said first set by comparing the rate of change of the movement vectors of the image components. For example, the method may comprise comparing the rate of change of the magnitude and/or the direction of the movement vectors. The method may comprise identifying at least one image component having a first movement vector comprising a first direction changing at a first rate and/or a first magnitude changing at a first rate.

The method may comprise forming said second set comprises comparing the movement vectors of the image components. The method may comprise identifying at least one image component having a second movement vector comprising a second direction and/or a second magnitude. The method may comprise forming said second set by comparing the rate of change of the movement vectors of the image components. For example, the method may comprise comparing the rate of change of the magnitude and/or the direction of the movement vectors. The method may comprise identifying at least one image component having a second movement vector comprising a second direction changing at a second rate and/or a second magnitude changing at a first rate.

The first direction and the second direction may be different from each other. The first magnitude and the second magnitude may be different from each other.

The method may comprise identifying image components in the image data which are spatially separated from each other.

The method may comprise modifying the movement vector of the at least one target image component in dependence on the movement vector of the or each non-target image component.

The image data may be video image data captured by one or more image sensors disposed on the vehicle. The or each image component is a persistent image component.

According to a further aspect of the present invention there is provided a control system for controlling operation of a host vehicle, the host vehicle being a land vehicle; wherein the control system comprises:
 a processor operable to track a target vehicle and generate a target vehicle trace;
 correlate a host vehicle location and/or a host vehicle trajectory with the target vehicle trace; and
 output a deviation signal for controlling a vehicle control module upon determination that the correlation between the host vehicle location and/or the host vehicle trajectory and the target vehicle trace exceeds a predefined deviation threshold. The target vehicle may be in front of the host vehicle. The target vehicle may, for example, be the vehicle in front of the host vehicle in a convoy or may be a lead vehicle in a convoy. The host vehicle may be a following vehicle (i.e. a vehicle which is following the target vehicle). By correlating the host vehicle location and/or the host vehicle trajectory, the processor may determine when the host vehicle is no longer following the target vehicle. When the processor determines that the host vehicle is no longer following the target vehicle, the deviation signal may be output to the vehicle control module to inhibit or to cancel operation of the vehicle control module in dependence on the target vehicle trace. The target vehicle trace may comprise a (geospatial) route followed by the target vehicle. The correlation may be performed as the host vehicle travels along the same route.

At least in certain embodiments, the host vehicle and the target vehicle are both land vehicles. The host vehicle and the target vehicle may be wheeled vehicles.

At least in certain embodiments, the processor may determine if a target vehicle identified in front of the host vehicle represents a valid lead vehicle or an invalid lead vehicle. The processor may thereby determine if operation of the vehicle control module in dependence on the target vehicle trace is a valid control strategy or an invalid control strategy. The processor may be configured to output a correlation signal for controlling the vehicle control module upon determination that the correlation between the host vehicle location and/or the host vehicle trajectory and the target vehicle trace is within the predefined deviation threshold. The correlation signal may provide a positive indication that the host vehicle location and/or the host vehicle trajectory are within the predefined deviation threshold.

According to a further aspect of the present invention there is provided a control system for controlling operation of a host vehicle, the host vehicle being a land vehicle; wherein the control system comprises:
 a processor operable to track a target vehicle and generate a target vehicle trace;
 correlate a host vehicle location and/or a host vehicle trajectory with the target vehicle trace; and
 output a correlation signal for controlling a vehicle control module upon determination that the correlation between the host vehicle location and/or the host vehicle trajectory and the target vehicle trace is within the predefined deviation threshold. At least in certain embodiments, the processor may determine if a target vehicle identified in front of the host vehicle represents a valid lead vehicle or an invalid lead vehicle. The processor may thereby determine if operation of the vehicle control module in dependence on the target vehicle trace is a valid control strategy or an invalid control strategy. If the target vehicle is a valid lead vehicle, the processor may activate the vehicle control module to control the host vehicle in dependence on the target vehicle trace. If the target vehicle is an invalid lead vehicle, the processor may de-activate the vehicle control module or inhibit operation of the vehicle control module in dependence on the target vehicle trace.

The vehicle control module may be configured to control dynamic operation of the host vehicle. For example, the vehicle control module may control one or more of the following set: a steering angle; a traction torque; a braking torque. The vehicle control module may, for example, comprise a cruise control module for the host vehicle. At least in certain embodiments, the vehicle control module is operable in dependence on the target vehicle trace. For example, the vehicle control module may operate at least substantially to match dynamic operation of the host vehicle to the target vehicle trace.

The target vehicle trace may comprise one or more of the following: a target vehicle location; a target vehicle speed; and a target vehicle trajectory. The processor may correlate the respective location and/or speed and/or trajectory of the host vehicle and the target vehicle.

The target vehicle trace may comprise (geospatial) location data for the target vehicle, for example defining the target vehicle route. The target vehicle route may comprise a target route for the following route.

The target vehicle trace may comprise target vehicle speed and/or target vehicle trajectory along the target vehicle route. The target vehicle speed may comprise a target speed for the host vehicle. The target vehicle trajectory may comprise a target trajectory for the host vehicle.

The target vehicle may be tracked continuously or periodically, for example at predetermined temporal or spatial intervals. The target vehicle location and/or the target vehicle speed and/or target vehicle trajectory may be determined continuously. Alternatively, the target vehicle location and/or the target vehicle speed and/or target vehicle trajectory may be determined at a plurality of intervals.

The deviation threshold may comprise a deviation distance threshold. The processor may be operable to determine when the distance between a current location of the host vehicle and the route taken by the target vehicle exceeds the deviation distance threshold.

The host vehicle trajectory may be determined in dependence on a steering angle of the host vehicle. Alternatively, or in addition, the host vehicle trajectory may be determined in dependence on an inertial signal, for example generated by one or more accelerometers and/or gyroscopes disposed in said host vehicle.

The target vehicle trace may optionally also comprise a trajectory of the target vehicle as it travels along said route. The predefined deviation threshold may comprises a divergence angle between a trajectory of the host vehicle and a trajectory of the target vehicle defined in the target vehicle trace.

The target vehicle route may be used to define a target route to be taken by the host vehicle. The processor may be operable to control a steering angle of the host vehicle to cause the host vehicle to follow the target route. The processor may, for example, control an electric power assist steering (EPAS) system. At least in certain embodiments, the control system described herein may provide autonomous or semi-autonomous steering control of the host vehicle.

Alternatively, or in addition, the target vehicle trace may comprise a speed of the target vehicle as it travels along the route. The predefined deviation threshold may comprises a speed threshold between a speed of the host vehicle and a speed of the target vehicle.

The processor may be operable to receive a signal from at least one sensor provided on the host vehicle. The processor may be operable to process said signal to generate the target vehicle trace. The signal may comprise image data captured by one or more image sensors. The processor may be operable to process said image data to generate the target vehicle trace. Alternatively, or in addition, the at least one sensor may comprise one or more of the following set: a LIDAR sensor, a RADAR sensor, an ultrasonic sensor.

According to a further aspect of the present invention there is provided a control system for controlling operation of a host vehicle, the host vehicle being a land vehicle; wherein the control system comprises:
  a controller comprising a processor and a memory device, the processor being configured to execute a set of instructions stored on the memory device;
  wherein, when executed, said instructions cause the processor to:
    track a target vehicle and generate a target vehicle trace;
    correlate a host vehicle location and/or a host vehicle trajectory with the target vehicle trace; and
    output a deviation signal for controlling a vehicle control module if the correlation between the host vehicle location and/or the host vehicle trajectory and the target vehicle trace exceeds a predefined deviation threshold.

According to a further aspect of the present invention there is provided a vehicle comprising a control system as described herein.

According to a further aspect of the present invention there is provided a method of controlling operation of a host vehicle, the host vehicle being a land vehicle; wherein the method comprises:
  tracking a target vehicle and generating a target vehicle trace; and
  correlating a location and/or a trajectory of the host vehicle with the target vehicle trace; and
  outputting a deviation signal if the correlation between the host vehicle location and/or the host vehicle trajectory and the target vehicle trace exceeds a predefined deviation threshold. The deviation signal may be suitable for controlling operation of a vehicle control module. For example, the vehicle control module may revert to a set target speed in dependence on said deviation signal.

The method may comprise outputting a correlation signal for controlling the vehicle control module upon determination that the correlation between the host vehicle location and/or the host vehicle trajectory and the target vehicle trace is within the predefined deviation threshold.

According to a further aspect of the present invention there is provided a method of controlling operation of a host vehicle, the host vehicle being a land vehicle; wherein the method comprises:
  tracking a target vehicle and generating a target vehicle trace; and
  correlating a location and/or a trajectory of the host vehicle with the target vehicle trace; and
  outputting a correlation signal for controlling the vehicle control module upon determination that the correlation between the host vehicle location and/or the host vehicle trajectory and the target vehicle trace is within the predefined deviation threshold. At least in certain embodiments, the method may enable determination of whether a target vehicle identified in front of the host vehicle represents a valid lead vehicle or an invalid lead vehicle. If the target vehicle is a valid lead vehicle, the method may comprise controlling the host vehicle in dependence on the target vehicle trace. If the target vehicle is an invalid lead vehicle, the method may comprise inhibiting control of the host vehicle in dependence on the target vehicle trace.

The method may comprise determining the host vehicle trajectory in dependence on a steering angle of the host vehicle.

The predefined deviation threshold may comprise a divergence angle between a trajectory of the host vehicle and a trajectory of the target vehicle defined in the target vehicle trace.

The predefined deviation threshold may comprise a distance between a current location of the host vehicle and a location of the target vehicle defined in the target vehicle trace.

The method may comprise receiving a signal from at least one sensor provided on the host vehicle. The method may comprise processing said signal to generate the target vehicle trace. The signal may comprise image data captured by one or more image sensors. The image data may be processed to generate the target vehicle trace. Alternatively, or in addition, the at least one sensor may comprise one or more of the following set: a LI DAR sensor, a RADAR sensor, an ultrasonic sensor.

According to a further aspect of the present invention there is provided a non-transitory computer-readable medium having a set of instructions stored therein which, when executed, cause a processor to perform the method(s) described herein.

The host vehicle may be a land vehicle. The target vehicle may be a land vehicle. The term "land vehicle" is used herein to refer to a vehicle configured to apply steering and drive (traction) forces against the ground. The vehicle may, for example, be a wheeled vehicle or a tracked vehicle.

The term "location" is used herein to refer to the relative position of an object on the surface of the earth. Unless indicated to the contrary, either explicitly or implied by the context, references herein to the location of an object refer to the geospatial location of that object.

It is to be understood that by the term 'type of terrain' is meant the material comprised by the terrain over which the vehicle is driving such as asphalt, grass, gravel, snow, mud, rock and/or sand. By 'off-road' is meant a surface traditionally classified as off-road, being surfaces other than asphalt, concrete or the like. For example, off-road surfaces may be relatively compliant surfaces such as mud, sand, grass, earth, gravel or the like. Alternatively or in addition off-road surfaces may be relatively rough, for example stony, rocky, rutted or the like. Accordingly in some arrangements an off-road surface may be classified as a surface that has a relatively high roughness and/or compliance compared with a substantially flat, smooth asphalt or concrete road surface.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the target following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying Figures, in which.

DETAILED DESCRIPTION

A control system 1 for controlling operation of a host vehicle 2 in accordance with an embodiment of the present invention will now be described with reference to the accompanying figures.

Figure 1:
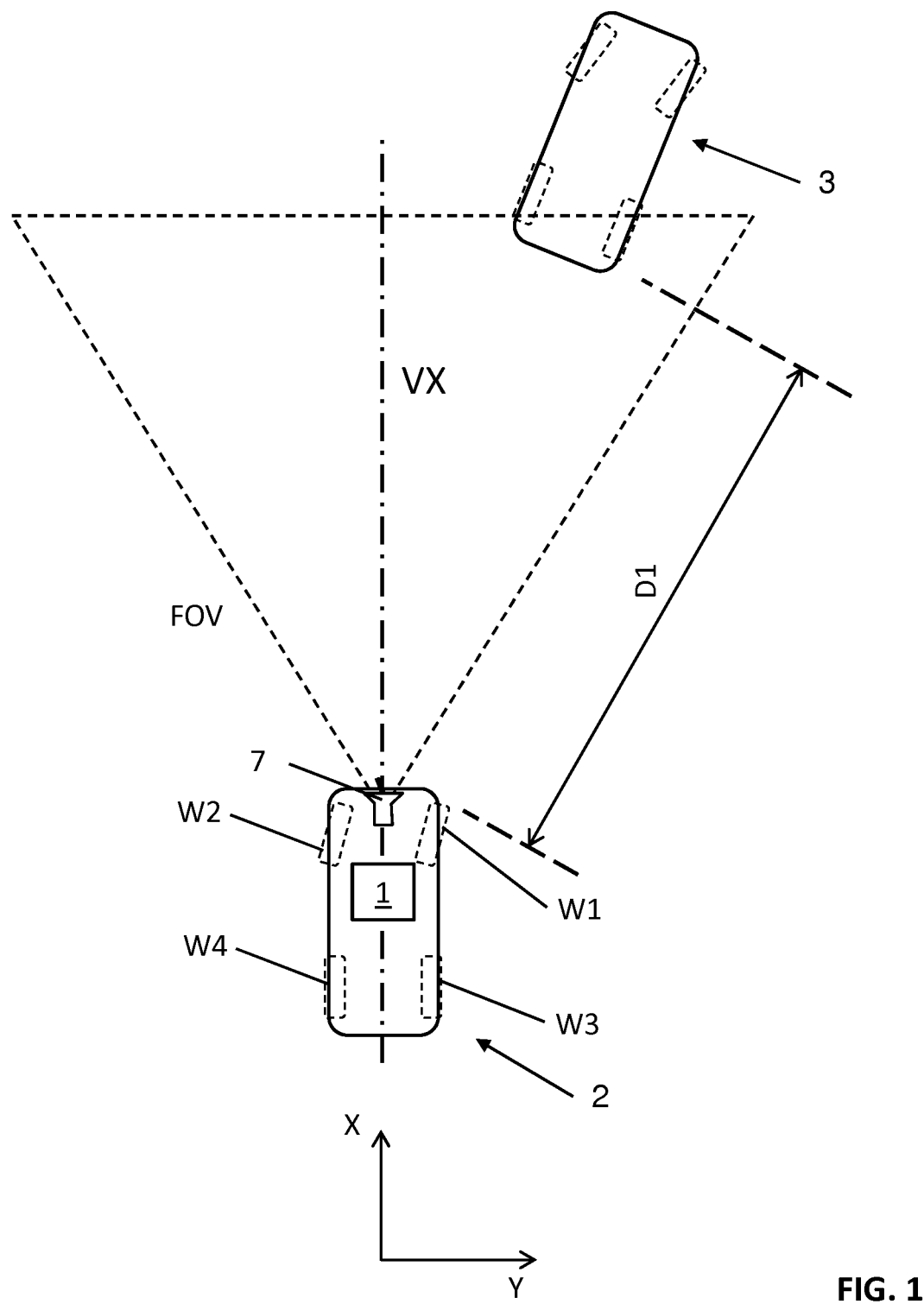
FIG. 1 shows a plan view of a host vehicle incorporating a control system in accordance with an embodiment of the present invention.
Figure 2:
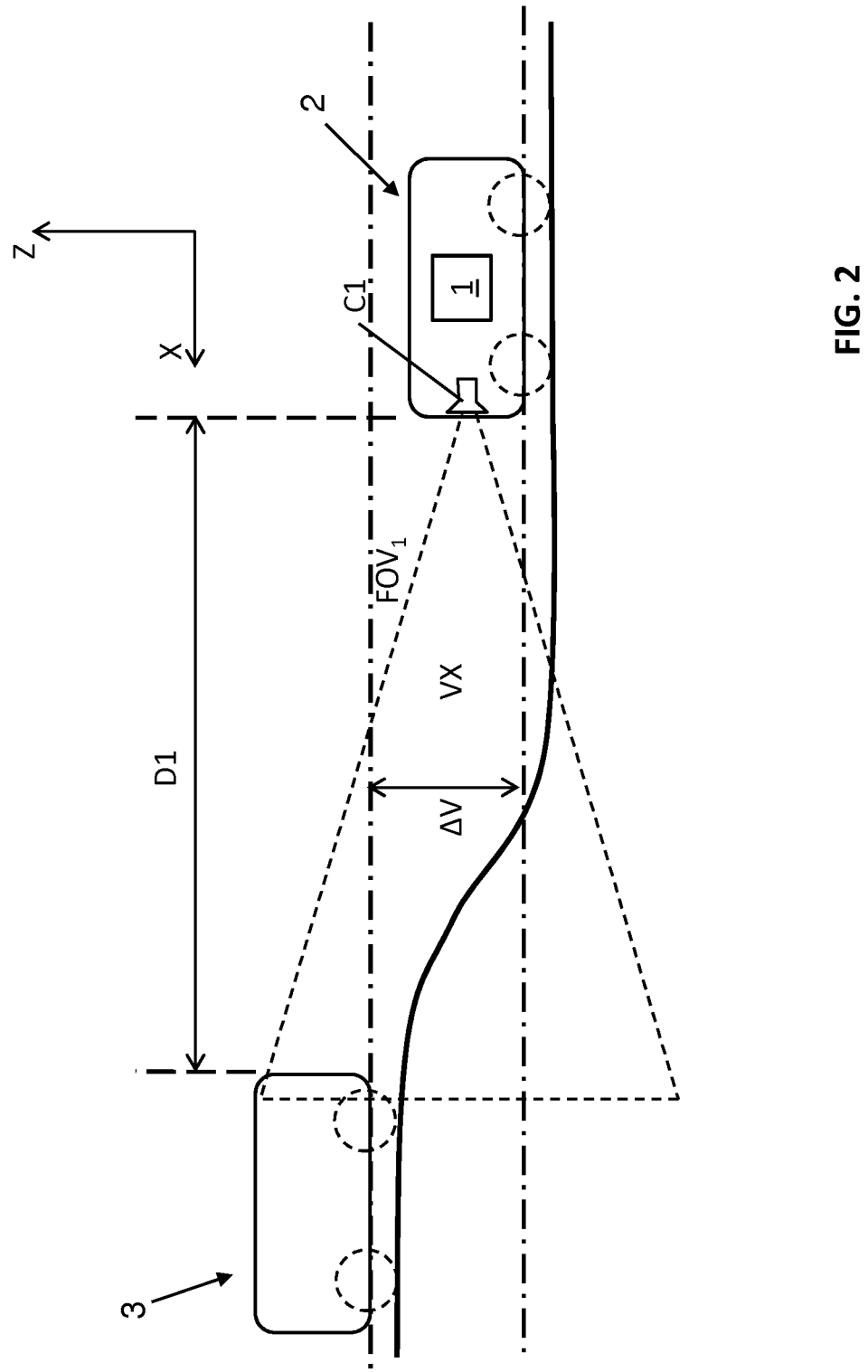
FIG. 2 shows a side elevation of the host vehicle shown in FIG. 1 incorporating the control system in accordance with an embodiment of the present invention.

The control system 1 is described herein with reference to a host vehicle reference frame comprising a longitudinal axis X, a transverse axis Y and a vertical axis Z. The control system 1 is operative to assist in the control of the host vehicle 2 particularly, but not exclusively, in an off-road driving scenario. As shown in FIGS. 1 and 2, the control system 1 is operable to track a target vehicle 3 in front of the host vehicle 2. The target vehicle 3 may, for example, be a target vehicle or a vehicle in front of the host vehicle 2 in a convoy. The host vehicle 2 and the target vehicle 3 are both land vehicles (i.e. vehicles configured to apply steering and drive (traction) forces against the ground).

The host vehicle 2 is a wheeled vehicle having four wheels W1-4. A torque is transmitted to the wheels W1-4 to apply a tractive force to propel the host vehicle 2. The torque is generated by one or more torque generating machine, such as an internal combustion engine or an electric traction machine, and transmitted to the driven wheels W1-4 via a vehicle powertrain. The host vehicle 2 in the present embodiment has four-wheel drive and, in use, torque is transmitted selectively to each of said wheels W1-4. It will be understood that the control system 1 could also be installed in a host vehicle 2 having two-wheel drive. The host vehicle 2 in the present embodiment is an automobile having off-road driving capabilities. For example, the host vehicle 2 may be capable of driving on an unmetalled road, such as a dirt road or track. The host vehicle 2 may, for example, be a sports utility vehicle (SUV) or a utility vehicle, but it will be understood that the control system 1 may be installed in other types of vehicle. The control system 1 may be installed in other types of wheeled vehicles, such as light, medium or heavy trucks. The target vehicle 3 is a wheeled vehicle, such as an automobile or an off-road vehicle. The target vehicle 3 may have the same configuration as the host vehicle 2 or may have a different configuration.

Figure 3:
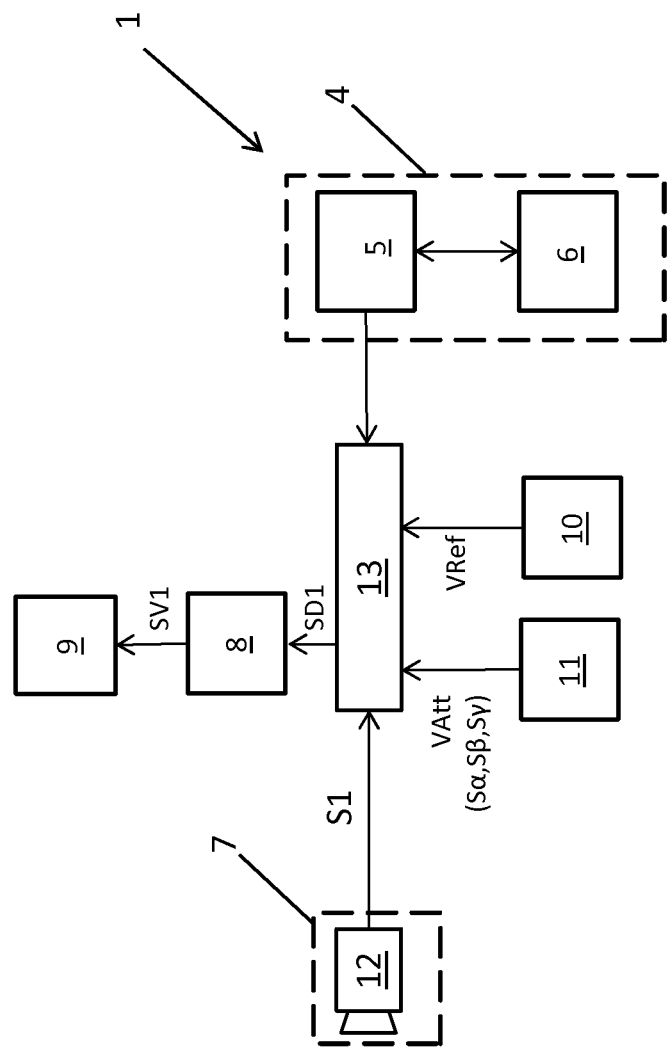
FIG. 3 shows a schematic representation of the control system incorporated into the host vehicle shown in FIGS. 1 and 2.

A schematic representation of the control system 1 installed in the host vehicle 2 is shown in FIG. 3. The control system 1 comprises a controller 4 having at least one electronic processor 5 and a memory 6. The processor 5 is operable to receive a data signal S1 from a sensing means 7. As described herein, the processor 5 is operable to process the data signal S1 to track the target vehicle 3. The processor 5 is operable to control operation of the host vehicle 2 in dependence on the relative location of the target vehicle 3. As described herein, the processor 5 is operable to control a target follow distance D1 in dependence on a determined vertical offset ΔV between the host vehicle 2 and the target vehicle 3. The target follow distance D1 is a target distance to be maintained between the host vehicle 2 and the target vehicle 3. The processor 5 is operable to output a target follow distance signal SD1 to a vehicle control module. In the present embodiment, the vehicle control module comprises a cruise control module 8. The cruise control module 8 is operable in a follow mode to control the host vehicle 2 to follow the target vehicle 3. When the follow mode is activated, the cruise control module 8 controls the host vehicle target speed to maintain the target follow distance D1 between the host vehicle 2 and the target vehicle 3. The cruise control module 8 may output a target speed signal SV1 to an engine control module 9 which controls the output torque transmitted to the wheels W1-4. The cruise control module 8 may also generate a brake control signal for controlling a braking torque applied to said wheels W1-4.

The processor 5 is operable to receive a reference speed signal VRef for indicating a current reference host vehicle target speed. The reference speed signal VRef may, for example, be generated by one or more wheel speed sensors 10. The processor 5 is operable to receive a vehicle attitude signal VAtt for indicating a current attitude of the host vehicle 2 about at least one axis. The vehicle attitude signal VAtt comprises one or more of the following: a vehicle pitch signal $S\alpha$ indicating a vehicle pitch angle $\alpha$; and a vehicle roll signal $S\beta$ indicating a vehicle roll angle $\beta$. The vehicle attitude signal VAtt is generated by a vehicle attitude sensor module 11 comprising one or more accelerometers and/or gyroscopes. The vehicle pitch angle $\alpha$ and the vehicle roll angle $\beta$ define the current angular orientation of the longitudinal axis X and the transverse axis Y respectively to a horizontal plane. The vehicle attitude signal VAtt may also comprise a vehicle yaw signal Sy indicating a vehicle yaw angle $\gamma$ As shown in FIG. 3, the sensing means 7 is mounted in a forward-facing orientation to establish a detection region in front of the host vehicle 2. The sensing means 7 comprises at least one optical sensor 12 mounted to the host vehicle 2. The sensing means 7 may comprise a single camera. Alternatively, the sensing means 7 may comprise a stereoscopic camera. The at least one optical sensor 12 may be mounted at the front of the vehicle, for example incorporated into a front bumper or engine bay grille; or may be mounted within the vehicle cabin, for example in front of a rear-view mirror. The at least one optical sensor 12 has a field of view FOV having a central optical axis VX extending substantially parallel to a longitudinal axis X of the host vehicle 2. The field of view FOV is generally conical in shape and extends in horizontal and vertical directions. The at least one optical sensor 12 comprises a digital imaging sensor for capturing image data. The at least one optical sensor 12 captures image data substantially in real-time, for example at 30 frames per second. The at least one optical sensor 12 in the present embodiment is operable to detect light in the visible spectrum of light. The sensing means 7 comprises optics (not shown) for directing the incident light onto an imaging sensor, such as a charge-coupled device (CCD), operable to generate image data for transmission in the data signal S1. Alternatively, or in addition, the sensing means 7 may be operable to detect light outside of the visible light spectrum, for example in the infra-red range to generate a thermographic image. Alternatively, or in addition, the sensing means 7 may comprise a Lidar sensor for projecting a laser light in front of the host vehicle 2. Other types of sensor are also contemplated.

The sensing means 7 is connected to the controller 4 over a communication bus 13 provided in the host vehicle 2. The data signal S1 is published to the communication bus 13 by the sensing means 7. In the present embodiment, the connection between the sensing means 7 and the controller 4 comprises a wired connection. In alternative embodiments, the connection between the sensing means 7 and the controller 4 may comprise a wireless connection, for example to enable remote positioning of the sensing means 7. By way of example, the sensing means 7 may be provided in a remote targeting system, such as a drone vehicle. The processor 5 is operable to read the data signal S1 from the communication bus 13. The processor 5 extracts the image data from the data signal S1 and implements an image processing algorithm to identify the target vehicle 3 within the image data. The image processing algorithm may recognise a shape or profile of the target vehicle 3, for example using pattern matching techniques. Alternatively, or in addition, the image processing algorithm may identify the target vehicle 3 based on relative movement of the target vehicle 3 between frames of the image date. The image processing algorithm may optionally use a known vehicle colour and/or vehicle type to identify the target vehicle 3 in the image data. By applying the image processing algorithm to successive frames of the image data, the processor 5 tracks the movement of the target vehicle 3. The processor 5 may also calculate a distance (range) to the target vehicle 3 from the host vehicle 2. The processor 5 may compare the size of the target vehicle 3 in the image data to a reference image taken at a known distance between the host vehicle 2 and the target vehicle 3. The reference image could, for example, be captured during a calibration phase.

The processor 5 may optionally calculate an attitude of the target vehicle 3, for example to calculate a pitch angle and/or a roll angle and/or a yaw angle of the target vehicle 3. The processor 5 may, for example, analyse the image data to identify one or more edges and/or one or more sides of the target vehicle 3. The processor 5 may compare the edges and/or sides identified in the image data to a virtual model of a vehicle to determine the attitude of the target vehicle 3. The virtual model could be generated based on one or more images of the target vehicle 3 captured during a calibration phase.

Figure 4:
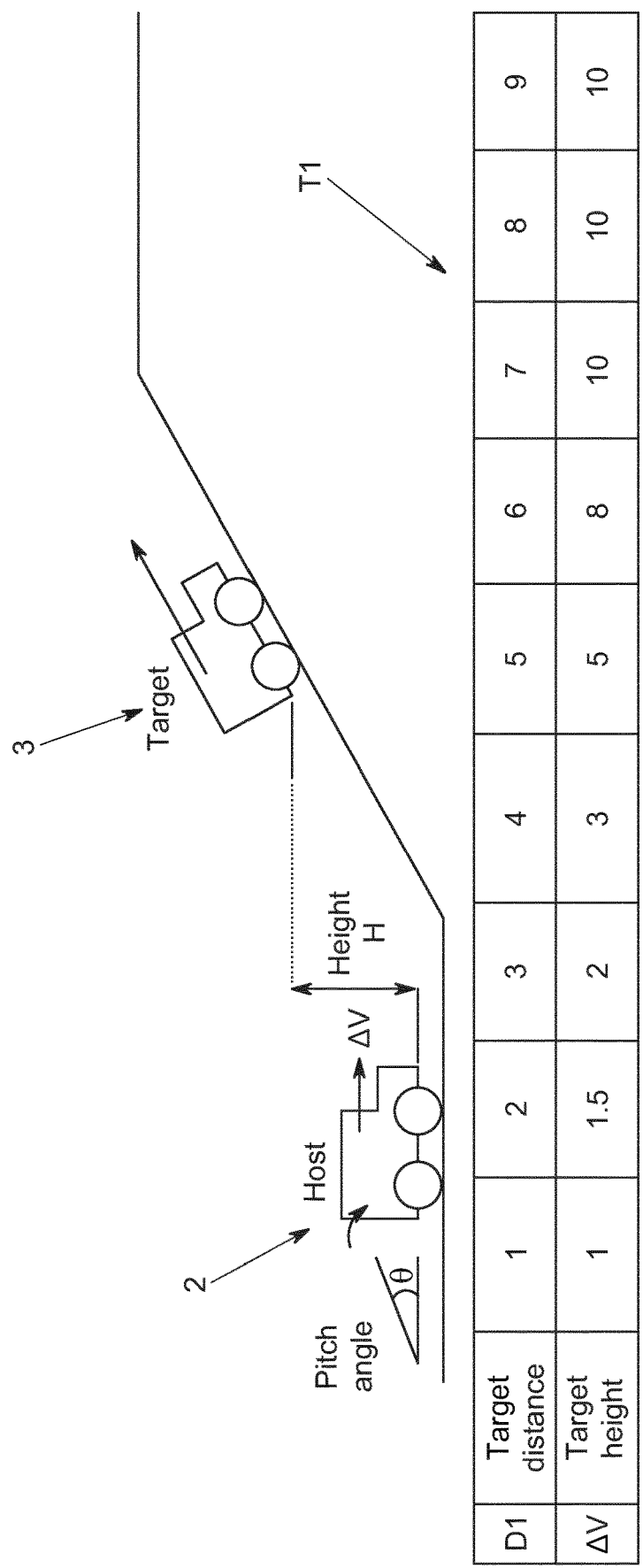
FIG. 4 illustrates the operation of the control system to set a target follow distance for a vehicle control module of the host vehicle.

As shown in FIGS. 2 and 4, the processor 5 is operable to determine the vertical offset $\Delta V$ (relative elevation) of the target vehicle 3 in relation to the host vehicle 2. The vertical offset $\Delta V$ is calculated from a predetermined reference point on the host vehicle 2 and an identifiable reference point on the target vehicle 3, such as a base of the body or a wheel centre of the target vehicle 3. The processor 5 receives the vehicle pitch signal $S\alpha$ and the vehicle roll signal $S\beta$ indicating the vehicle pitch angle $\alpha$ and the vehicle roll angle $\beta$ of the host vehicle 2. The processor 5 uses the vehicle pitch signal $S\alpha$ to determine the orientation of the central optical axis VX in a vertical plane and thereby determines the orientation of the field of view FOV1 in three-dimensional space. The processor 5 identifies the target vehicle 3 in the image data and determines an elevation angle $\alpha 1$ (positive or negative) relative to the central optical axis VX. The processor 5 sums the elevation angle $\alpha 1$ and the known pitch angle $\alpha$ and the total is used to calculate the vertical offset $\Delta V$ of the target vehicle 3 in dependence on the distance to the target vehicle 3. A positive value for the vertical offset $\Delta V$ indicates that the target vehicle 3 is at a higher elevation (i.e. above the height of) the host vehicle 2; and a negative value for the vertical offset $\Delta V$ indicates that the target vehicle 3 is at a lower elevation (i.e. below the height of) the host vehicle 2. It will be understood that the vehicle roll signal $S\beta$ may alter the apparent vertical offset $\Delta V$ depending on the position of the target vehicle 3 within the image. The processor 5 may also apply a correction based on the known vehicle roll angle $\beta$ of the host vehicle 2.

Figure 5:
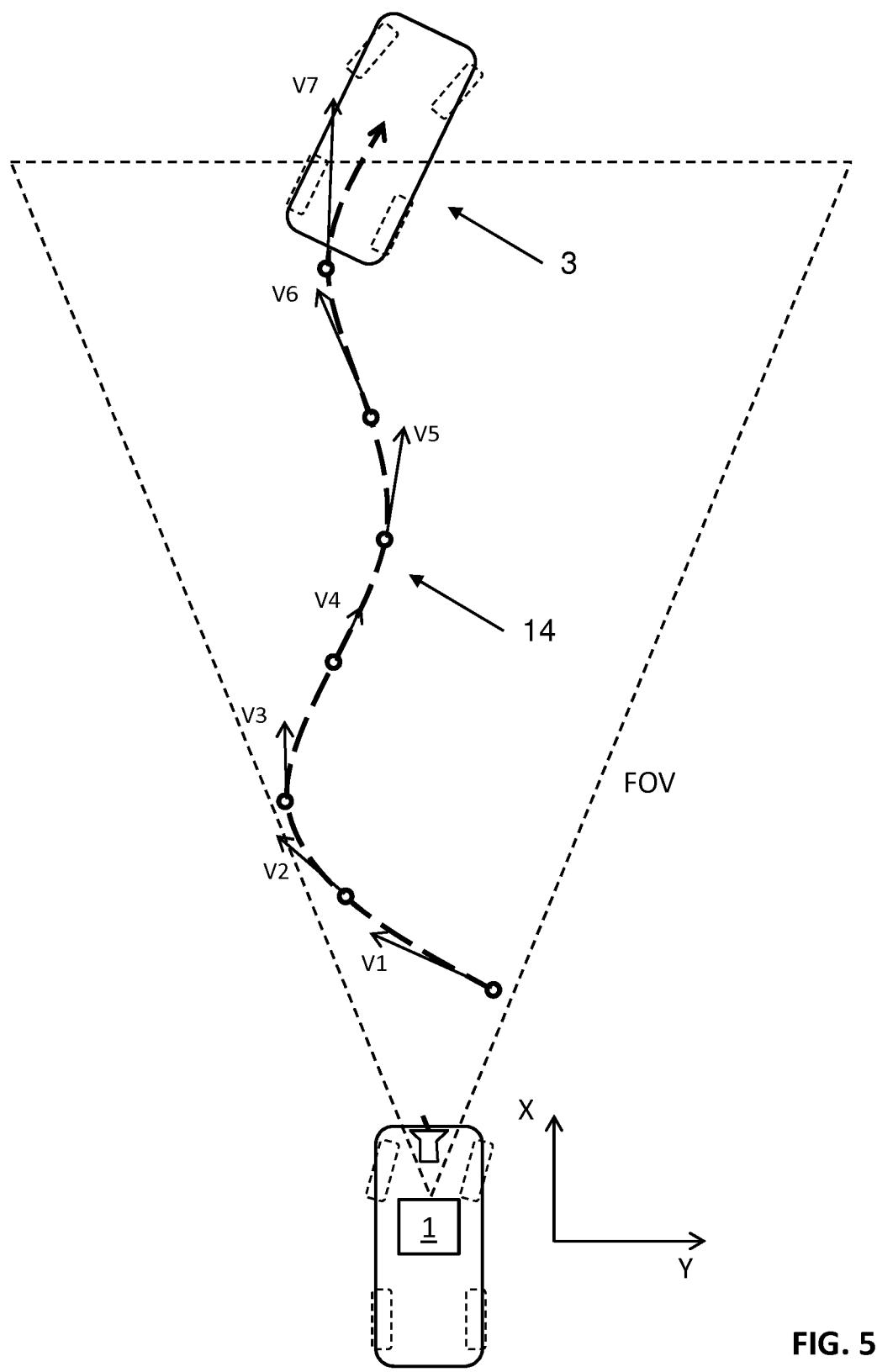
FIG. 5 illustrates the operation of the control system to calculate a target vehicle trace.

The processor 5 may track the target vehicle 3 to determine a target vehicle route, i.e. the route taken by the target vehicle 3. The processor 5 may optionally analyse the data signal S1 to calculate a target vehicle speed and/or a target vehicle trajectory as the target vehicle 3 travels along said target vehicle route. The speed and/or trajectory may be calculated at known time or spatial intervals along said target vehicle route. The processor 5 may store the calculated target vehicle speed to build a speed profile for the target vehicle 3 as it travels along a route. The calculated speed and/or trajectory (direction of travel) of the target vehicle 3 may optionally be stored along with an instant location of the target vehicle 3 (either known or calculated). The calculated speed and/or trajectory at any given location may be defined as a movement vector Vn having a magnitude (representing the target vehicle speed) and direction (representing the trajectory of the target vehicle 3). As illustrated in FIG. 5, multiple movement vectors Vn can be calculated for the target vehicle 3 to generate a target vehicle trace 14. The target vehicle trace 14 represents the (geospatial) target vehicle route as well as the target vehicle speed along that route. The target vehicle trace 14 may optionally also comprise the trajectory of the target vehicle 3 along the target vehicle route. The position of each movement vector Vn indicates a calculated position of the target vehicle 3. The length of the movement vectors Vn represents a calculated target vehicle speed at that location; and the direction of the movement vectors Vn represents a trajectory of the target vehicle 3 at that location. The processor 5 stores each movement vector Vn in conjunction with the calculated location of the target vehicle 3 to build the target vehicle trace 14. The movement vectors Vn may be calculated at predetermined time intervals, for example one calculation per second. The movement vectors Vn may optionally be time-stamped to indicate the time at which they were generated. The location of the target vehicle 3 may be calculated relative to the host vehicle 2 (for example a separation distance and/or orientation). Alternatively, the location of the target vehicle 3 may comprise a real-world location, for example determined with reference to positional data (for example GPS data) and/or map data. The movement vectors Vn can be stored as a sequence along a target vehicle route. The target vehicle trace 14 may subsequently be used by the processor 5 as an input for controlling the host vehicle 2, for example to match a host vehicle target speed to a calculated target vehicle speed at a corresponding location on a route. The target vehicle trace 14 illustrated in FIG. 5 is defined in two dimensions corresponding to a plan view of the target vehicle route. However, it will be appreciated that the target vehicle trace 14 may be generated in three dimensions, for example to represent the elevation of the target vehicle 3.

The speed at which the target vehicle 3 is travelling may be calculated in dependence on a detected movement of the target vehicle 3 between frames of the image data. The processor 5 may compensate for movements of the host vehicle 2 when estimating the speed at which the target vehicle 3 is travelling. In particular, the processor 5 may take account of the reference host vehicle target speed (which is known from the reference speed signal VRef) and/or angular movements of the host vehicle 2 (which are known from the vehicle roll signal Sβ and/or the vehicle pitch signal Sα and/or the vehicle yaw signal Sγ). The movements of the target vehicle 3 within the image data may thereby be adjusted to compensate for movements of the host vehicle 2 (which affect the orientation of the sensing means 7).

The control system 1 is operative to assist in the dynamic control of the host vehicle 2. The processor 5 outputs the follow distance signal SV1 to the communication bus 13 to control dynamic operation of the host vehicle 2 in dependence on the determined vertical offset ΔV between the host vehicle 2 and the target vehicle 3. In the present embodiment, the control system 1 is operative to set the target follow distance D1 between the host vehicle 2 and the target vehicle 3. The target follow distance D1 is the distance to be maintained between the host vehicle 2 and the target vehicle 3. In the present embodiment, the control system 1 sets the target follow distance D1 in dependence on the determined vertical offset ΔV. The target follow distance D1 could be calculated dynamically in dependence on the determined vertical offset ΔV. The target follow distance D1 may be calculated in dependence on one or more of the following factors: the determined vertical offset ΔV; the reference host vehicle target speed; the calculated target vehicle speed; the pitch angle α of the host vehicle 2; and the pitch angle of the target vehicle 3. In the present embodiment, the processor 5 is operable to access a lookup table T1 stored in the memory 6 to determine the target follow distance D1. As shown in FIG. 4, the target follow distance D1 is defined in the lookup table T1 with reference to the determined vertical offset ΔV. The processor 5 reads the target follow distance D1 for the vertical offset ΔV from the lookup table T1 and generates the target follow distance signal S1 to set the target follow distance D1 for the cruise control module 8.

Figure 6:
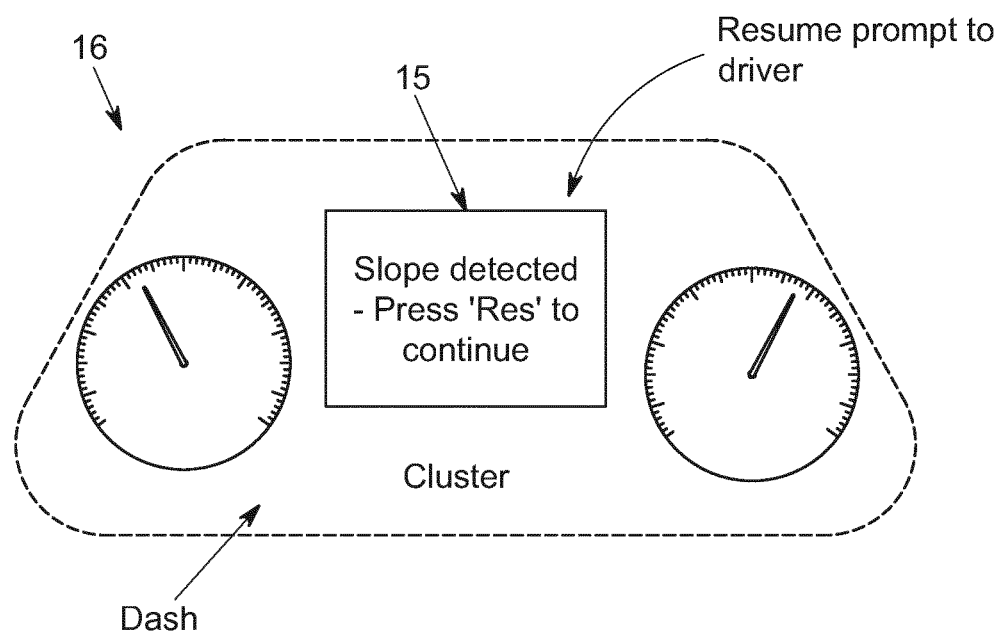
FIG. 6 illustrates an instrument cluster generating a driver notification.

The processor 5 may be operable to process the vertical offset ΔV to identify terrain features and characteristics. For example, the processor 5 may determine a rate of change of the vertical offset ΔV. The rate of change of the vertical offset ΔV may provide an indication of a change in the gradient of a slope on which the target vehicle 3 is travelling. Identifying when the rate of change of the vertical offset ΔV changes from a substantially steady state condition may indicate that the target vehicle 3 is beginning to ascend a slope. Conversely, identifying when the rate of change of the vertical offset ΔV changes to a substantially steady state condition may indicate that the target vehicle 3 is cresting a slope. As shown in FIG. 6, a notification may be output to a display screen 15 provided in the host vehicle 2, for example provided in an instrument cluster 16, to notify the driver of the host vehicle 2 that a slope has been detected. A prompt may be output requesting that the driver press a resume button (not shown) to continue. It will be understood that, when determining the rate of change of the vertical offset ΔV, the processor 5 may allow for changes resulting from the movements of the host vehicle 2, for example to compensate for changes in the elevation of the host vehicle 2.

There may be circumstances when it is no longer appropriate for the cruise control module 8 to operate in the follow mode described herein. The processor 5 may optionally be operable to deactivate the cruise control module 8 in dependence on the vertical offset ΔV between the host vehicle 2 and the target vehicle 3. The processor 5 may, for example, be operable to deactivate the cruise control module 8 when the vertical offset ΔV exceeds a predetermined first offset threshold. The first offset threshold may, for example, be stored in the memory 6. The processor 5 is operable to monitor the vertical offset ΔV and, upon determining that the vertical offset ΔV is greater than the predetermined first offset threshold, to deactivate the cruise control module 8. Alternatively, or in addition, the processor 5 may be operable to increase the target follow distance D1 if the determined vertical offset ΔV exceeds the first offset threshold. The processor 5 may optionally deactivate the cruise control module 8 if the determined vertical offset ΔV exceeds a second offset threshold which is larger than the first offset threshold. Alternatively, or in addition, the processor 5 may be operable to bring the host vehicle 2 to a halt when the determined vertical offset ΔV exceeds the predefined first offset threshold. Alternatively, or in addition, the processor 5 may be operable to output an alert or notification to a driver of the host vehicle 2 when the determined vertical offset ΔV exceeds the predefined first offset threshold.

The present invention has been described in relation to determining a vertical offset ΔV between the host vehicle 2 and the target vehicle 3. In a variant, the control system 1 in accordance with the present invention may be operable to determine an absolute elevation of the target vehicle 3, for example with reference to sea level. The elevation of the host vehicle 2 may be known, for example with reference to GPS data. The absolute elevation of the target vehicle 3 may be calculated in dependence on the elevation of the host vehicle 2. The absolute elevation of the target vehicle 3 may be used to calculate the location of the target vehicle 3, for example in dependence on map data stored in the memory 6 or a separate data storage device.

The operation of the control system 1 in conjunction with the cruise control module 8 will now be described. The cruise control module 8 is activated and dynamically controls the host vehicle target speed in order to maintain a target follow distance D1 between the host vehicle 2 and the target vehicle 3. The control system 1 is operable to adjust the target follow distance D1 in dependence on the determined vertical offset ΔV between the host vehicle 2 and the target vehicle 3. The at least one optical sensor 12 is forward-facing and has a field of view FOV which captures a scene in front of the host vehicle 2. In use, the at least one optical sensor 12 captures image data which is transmitted to the processor 5 in the data signal S1. The processor 5 processes the image data to identify the target vehicle 3 within the captured scene. The processor 5 analyses of the image data to determine the vertical offset ΔV between the host vehicle 2 and the target vehicle 3. The processor 5 then accesses the lookup table T1 stored in memory 6 and reads a target follow distance D1 in dependence on the determined vertical offset ΔV. The processor 5 then outputs a target follow distance signal SD1 to the cruise control module 8. The cruise control module 8 controls the host vehicle target speed to maintain the target follow distance D1 determined by the processor 5 in dependence on the determined vertical offset ΔV.

The processor 5 may be operable to generate a host vehicle trace 18. The host vehicle trace 18 may represent the (geospatial) route taken by the host vehicle 2 as well as the speed of the host vehicle 2 along that route. The host vehicle trace 18 may optionally also comprise the trajectory of the host vehicle 2 along the target vehicle route. The host vehicle trace 18 may optionally comprise vehicle attitude data generated by the vehicle attitude sensor module 11. For example, the host vehicle trace 18 may comprise one or more of the following: the pitch angle α, and the roll angle β, and the yaw angle γ. The vehicle attitude data may be stored along said host vehicle trace 18, for example by defining the orientation of the longitudinal axis X, a transverse axis Y and a vertical axis Z making up the reference frame of the host vehicle 2. The vehicle attitude data may optionally also comprise acceleration data about one or more of said axis.

In use, tracking of the target vehicle 3 may be lost or interrupted, for example due to the presence of obstacles or terrain features between the host vehicle 2 and the target vehicle 3 which partially or completely obscure the target vehicle 3. The target vehicle trace 14 may be used to predict the location of the target vehicle 3 after tracking is lost or interrupted. For example, the processor 5 may be operable to predict movement of the target vehicle 3 in dependence on one or more of the following: an identified location of the target vehicle 3 when tracking was interrupted; a trajectory of the target vehicle 3 when tracking was interrupted; a speed of travel of the target vehicle 3 when tracking was interrupted; and map (geographic) data showing possible routes from a last-known location of the target vehicle 3. By predicting a location of the target vehicle 3, at least in certain embodiments the processor 5 may be operable more quickly to re-establish tracking of the target vehicle 3.

As outlined above, the processor 5 may track the target vehicle route. At least in certain embodiments, the processor 5 may calculate the speed and/or the trajectory of the target vehicle 3. The calculated speed and/or trajectory at a given location may be defined as a movement vector Vn having a magnitude (representing the target vehicle speed) and direction (representing the trajectory of the target vehicle 3). By repeating these calculations (for example at predetermined temporal or spatial intervals), the processor 5 builds the target vehicle trace 14 for the target vehicle 3, as illustrated in FIG. 5. A modified embodiment of the control system 1 described herein with reference to FIGS. 1 to 6 may utilise the resulting target vehicle trace 14 for controlling the host vehicle 2. The modified embodiment of the control system 1 will now be described with reference to FIGS. 7, 8 and 9. Like reference numerals are used for like components and the description of this embodiment will focus on the modifications.

Figure 7:
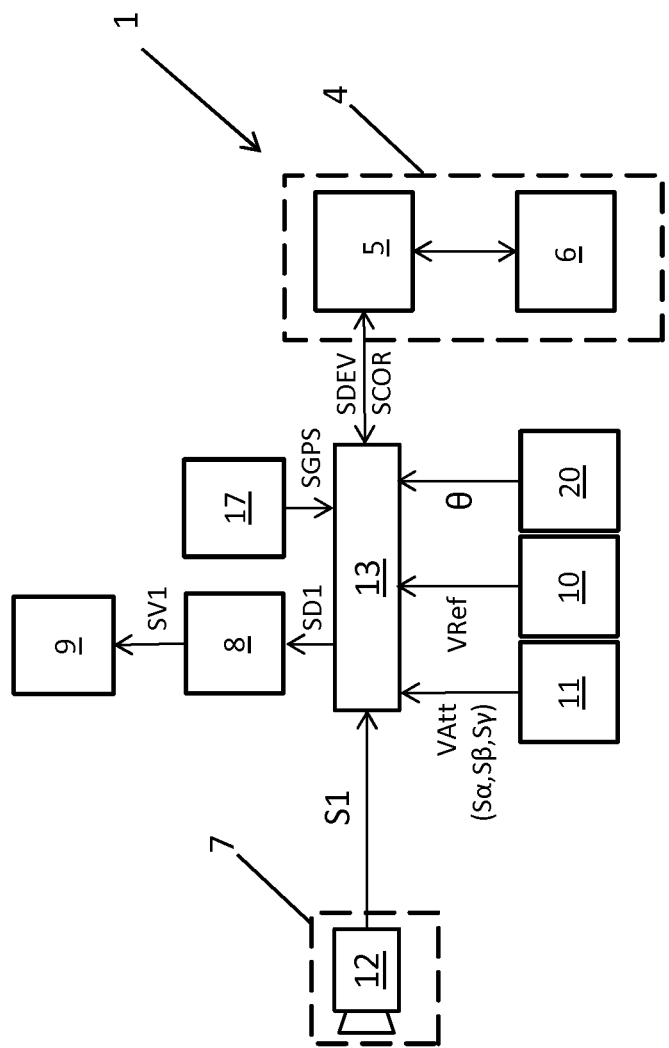
FIG. 7 shows a schematic representation of the control system in accordance with a further embodiment of the present invention.
Figure 8:
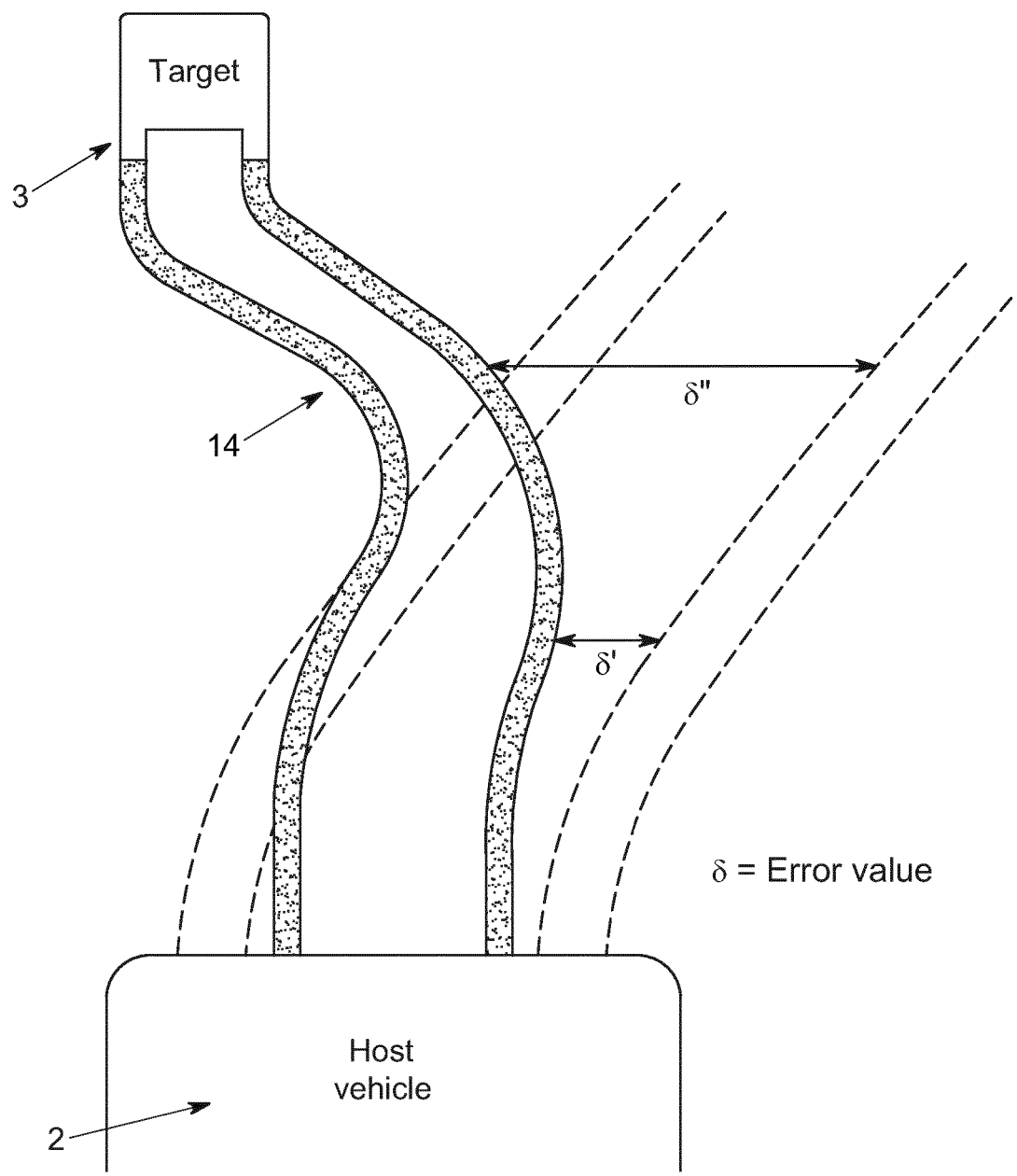
FIG. 8 shows a comparison of the path of the host vehicle to the tracked movements of the target vehicle.

The control system 1 according to the modified embodiment is operable to compare the movements of the host vehicle 2 to the tracked movements of the target vehicle 3. As described herein, the processor 5 is operable to build the target vehicle trace 14. As shown in FIG. 7, the processor 5 is configured to receive a location signal SGPS from a GPS module 17. The location signal SGPS comprises location data specifying a current location of the host vehicle 2. The processor 5 uses the location data from the GPS module 17 to compare a current route of the host vehicle 2 to the (historic) tracked target vehicle route. The processor 5 in the present embodiment is operable to compare the location data from the GPS module 17 with the target vehicle trace 14 stored in the memory 6. The processor 5 correlates the movements of the host vehicle 2 to the recorded movements of the target vehicle 3. As illustrated in FIG. 8, the processor 5 determines a deviation δ between the current route of the host vehicle 2 and the tracked route of the target vehicle 3. The deviation δ in the present embodiment comprises a distance between the current location of the host vehicle 2 and the nearest point on the tracked route of the target vehicle 3.

If the processor 5 determines that the deviation δ exceeds a predetermined deviation threshold, a deviation signal SDEV may be generated. In the present embodiment, the processor 5 determines that the host vehicle 2 is deviating from the target vehicle route if the distance between the location of the host vehicle 2 and the target vehicle trace 14 exceeds a predefined distance threshold. The deviation signal SDEV is published to the communication bus 13 and read by the cruise control module 8. The cruise control module 8 is configured to deactivate a currently active follow mode in dependence on said deviation signal SDEV. Thus, if the processor 5 determines that the host vehicle 2 is deviating from the target vehicle route, the deviation signal SDEV is generated to deactivate the follow mode of the cruise control module 8.

If the processor 5 determines that the deviation δ is within the predetermined deviation threshold, a correlation signal SCOR may be generated. In the present embodiment, the processor 5 determines that the path of the host vehicle 2 at least substantially corresponds to that of the target vehicle route if the distance between the location of the host vehicle 2 and the target vehicle trace 14 remains with a predefined distance threshold. The deviation signal SCOR is published to the communication bus 13 and read by the cruise control module 8. The cruise control module 8 is configured to activate a follow mode in dependence on the correlation signal SCOR. Thus, if the processor 5 determines that the host vehicle 2 is following the target vehicle route, the correlation signal SCOR is generated to activate the follow mode of the cruise control module 8. It will be understood that this control strategy may be used to detect a target vehicle 3 and to automatically or semi-automatically activate the vehicle control module.

Figure 9:
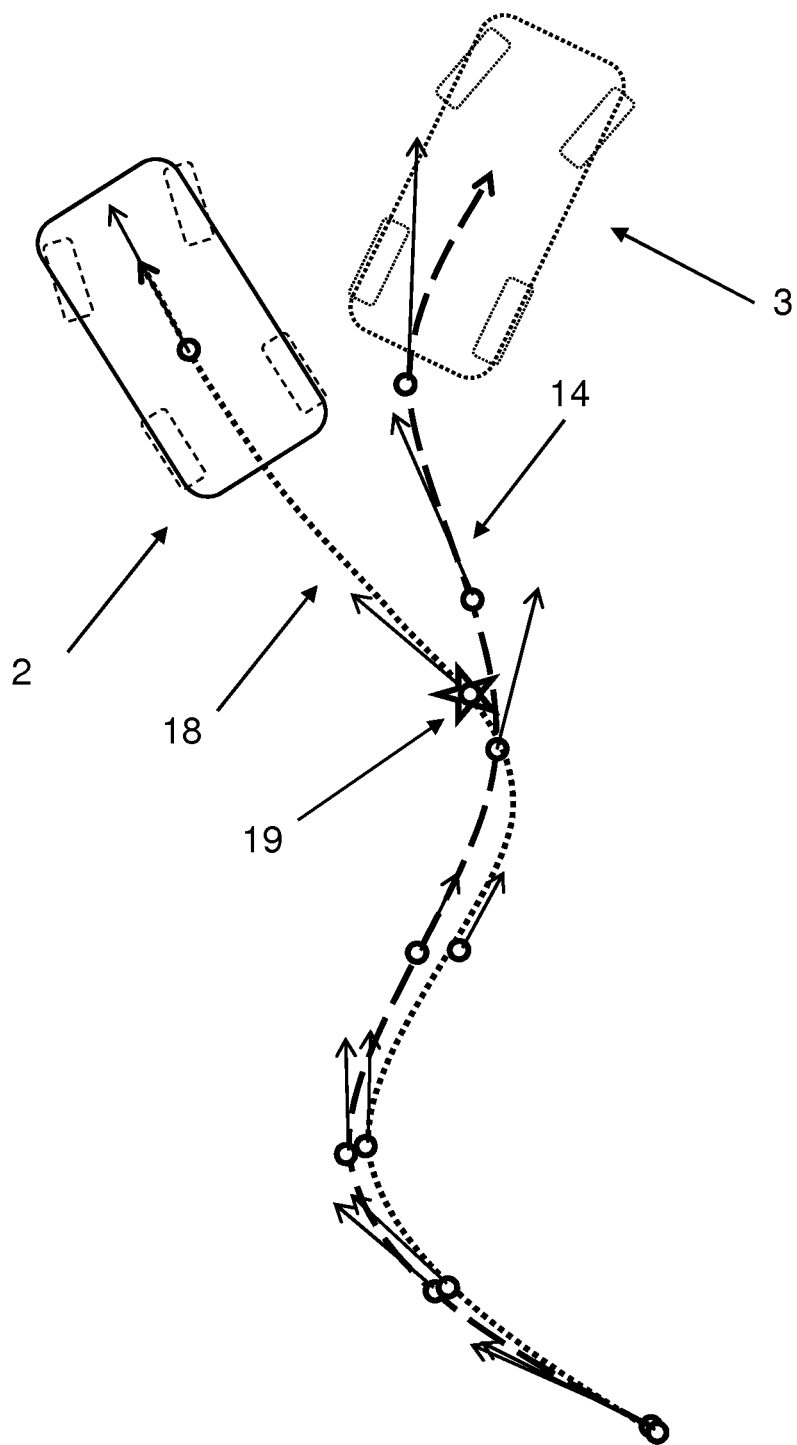
FIG. 9 shows determination of a deviation between the path of the host vehicle and the tracked movements of the target vehicle.

Alternatively, or in addition, the processor 5 may compare the trajectory of the host vehicle 2 to the trajectory of the target vehicle 3 along the target vehicle route. The processor 5 may determine that the host vehicle 2 has deviated from the target vehicle route if the comparison of the trajectory of the host vehicle 2 and that of the target vehicle 3 at a corresponding location exceeds a predefined angular threshold or is within a predefined angular threshold. This operating mode is illustrated in FIG. 9. The target vehicle route taken by the host vehicle 2 initially follows the tracked route of the target vehicle 3, which may be determined with reference to the target vehicle trace 14. When the trajectory of the host vehicle 2 exceeds the predefined angular threshold, the processor 5 outputs the deviation signal SDEV to deactivate the follow mode of the cruise control module 8. In the illustrated arrangement, the processor 5 determines that the host vehicle 2 is no longer following the tracked route of the target vehicle 3 at a deviation point 19 (denoted by a star indicia in FIG. 9). When the trajectory of the host vehicle 2 is within the predefined angular threshold, the processor 5 outputs the correlation signal SCOR to activate the follow mode of the cruise control module 8.

Alternatively, or in addition, the processor 5 may consider a steering angle θ of the host vehicle 2 when comparing the current route of the host vehicle 2 and the tracked routed of the target vehicle 3. The steering angle θ is published to the communication bus 13, for example by a steering angle sensor 20 associated with a steering wheel (not shown), and is read by the processor 5. A comparison of the trajectory of the target vehicle 3 and the steering angle θ provides an indication of whether the host vehicle 2 is following the tracked route of the target vehicle 3. The processor 5 may calculate the divergence of the target vehicle route taken by the host vehicle 2 and the target vehicle route. At least in certain embodiments, the processor 5 may determine if the driver of the host vehicle 2 is intentionally steering away from the target vehicle route. The processor 5 may determine when the intended path of the host vehicle differs from the target vehicle route. By measuring any such deviation, the processor may determine that the host vehicle 2 is no longer following the target vehicle 3. The processor 5 may, for example, be operable to resume a driver requested speed, rather than to set the target speed in dependence on the determined target vehicle speed.

The processor 5 may be operable to determine the trajectory of the target vehicle 3 in dependence on the target vehicle trace 14. This may be used to provide an element of prediction of a possible location of the target vehicle 3 when tracking is interrupted. For example, knowledge of the steering angle θ of the host vehicle and/or odometry data can be used to establish if the host vehicle 2 is taking a similar path to the target vehicle 3. In this situation, action can be taken by the host vehicle 2 to improve confidence, for example holding the current target (follow) speed or the speed at which the target vehicle 3 was travelling when tracking was interrupted. The target speed of the host vehicle 2 can be held for a time or distance to allow re-establishment of tracking of the target vehicle 3, for example when the target vehicle 3 reappears from around a corner or from behind an obstacle.

The processor 5 could be modified to generate a host vehicle trace 18 for comparison with the target vehicle trace 14. The location data generated by the GPS module 17 to identify the geospatial location of the host vehicle 2 could be stored in the memory 6. The processor 5 may also store dynamic operating parameters of the host vehicle 2, such as the reference speed (derived from the GPS module 17 or other on-board sensors, such as the wheel speed sensors 10). The host vehicle trace 18 and the target vehicle trace 14 could be compared using a pattern matching algorithm to assess the correlation between the traces. The comparison may, for example, compare the relative positions of the host vehicle 2 and the target vehicle 3; and/or the trajectory of the host vehicle 2 and the target vehicle 3. If the deviation δ between the host vehicle trace 18 and the target vehicle trace 14 exceeds a predefined deviation threshold δ", the processor 5 is configured to output the deviation signal SDEV. If the deviation δ between the host vehicle trace 18 and the target vehicle trace 14 is within a predefined deviation threshold δ", the processor 5 is configured to output the correlation signal SCOR.

It will be appreciated that various modifications may be made to the embodiment(s) described herein without departing from the scope of the appended claims. The target vehicle 3 may comprise an active or passive marker to facilitate identification by the processor 5. A passive marker may, for example, comprise a visible target or reflector (either an optical or radio wave reflector) which may be detected by appropriate detection means provided on the host vehicle 2. An active marker may comprise an active source, such as a wireless radio frequency (RF) transmitter or a light source (for emitting visible or infrared light), to facilitate identification by the processor 5. The host vehicle 2 may comprise detection means.

As outlined herein, the processor 5 may process the image data generated by the at least one optical sensor 12 to calculate the attitude of the target vehicle 3. The processor 5 may, for example, determine an orientation of a reference frame of the target vehicle 3. The processor 5 may analyse the image data captured by the at least one optical sensor 12 to calculate the orientation a longitudinal axis X1, a transverse axis Y1 and a vertical axis Z1 of the target vehicle 3. The processor 5 may be operable to store the resulting target vehicle attitude data in conjunction with the location data. For example, the processor 5 may store the target vehicle attitude data with said target vehicle trace 14. The processor 5 may be operable to control the host vehicle target speed and/or the target follow distance D1 in dependence on the angular attitude of the target vehicle 3 about one or more of said axes. For example, the processor 5 may reduce the following target speed and/or increase the target follow distance D1 if the angular orientation of the target vehicle 3 is greater than or equal to a predefined angular threshold. Alternatively, or in addition, when comparing the routes taken by the host vehicle 2 and the target vehicle 3, the processor 5 may be configured to compare the attitude of the host vehicle 2 and the target vehicle 3.

The target vehicle trace 14 and/or the host vehicle trace 18 may be stored indefinitely. The historic data may be referenced at a later time, for example when repeating the target vehicle route. The target vehicle trace 14 and/or the host vehicle trace 18 could optionally be shared, for example transferred to another vehicle intending to follow the same route.

The control system 1 described herein is operable to selectively activate and/or deactivate the cruise control module 8. Alternatively, or in addition, the control system 1 may be operable to selectively activate and/or deactivate a steering control module (not shown) operable to control a steering angle θ of the host vehicle 2. The steering control module may, for example, be incorporated into the vehicle control module described herein. The steering control module may provide autonomous or semi-autonomous control of the steering of the host vehicle 2, for example by controlling an electric power assist steering (EPAS) system. The target vehicle route may be used to define a target route to be taken by the host vehicle 2. The EPAS system may be operable to control the host vehicle 2 to follow the target route. The control system 1 described herein may selectively activate and/or deactivate the steering control module to enable and/or disable autonomous or semi-autonomous control of the steering. When the trajectory of the host vehicle 2 is within the predefined angular threshold, the processor 5 outputs the correlation signal SCOR to activate the steering control module. When the trajectory of the host vehicle 2 exceeds the predefined angular threshold, the processor 5 outputs the deviation signal SDEV to deactivate the steering control module. It is envisaged that the control functions described herein in relation to the cruise control module 8 may be equally applicable to these control functions.

The processor 5 has been described as generating a target vehicle trace 14 by storing the movement vectors along a calculated route of the target vehicle 3. Alternatively, or in addition, the processor 5 may be operable to store data relating to a determined attitude of the target vehicle 3 along the calculated route. For example, the processor 5 may store a calculated pitch angle and/or roll angle and/or yaw angle of the target vehicle 3 as it travels along the calculated route. The processor 5 may be operable also to evaluate the terrain over which the target vehicle 3 is travelling. Alternatively, or in addition, the processor 5 may be operable to store terrain data generated as a result of this evaluation process along the calculated route traveled by the target vehicle 3. The processor 5 may utilise one or more of the stored datasets when planning a route for the host vehicle 2.

Embodiments of the invention may be understood by way of the below numbered clauses:

1. A control system for controlling operation of a host vehicle, the host vehicle being a land vehicle; wherein the control system comprises:
    a processor for receiving a signal from sensing means, the processor being operable to process the signal to identify a target vehicle which is a land vehicle; and to determine a vertical offset between the host vehicle and the target vehicle.
2. A control system according to clause 1, wherein the processor is operable to set a target follow distance between the host vehicle and the target vehicle in dependence on the determined vertical offset between the host vehicle and the target vehicle.
3. A control system according to clause 1 or clause 2, wherein the processor is operable to determine a rate of change of the determined vertical offset.
4. A control system according to clause 3, wherein the processor is operable to identify a base of an incline and/or a crest of an incline in dependence on the rate of change of the determined vertical offset.
5. A control system according to clause 3 or clause 4, wherein the processor is operable to determine when the rate of change of the vertical offset decreases below a first threshold value; and/or to determine when the rate of change of the vertical offset increases above a second threshold value.
6. A control system according to any one of the preceding clauses, wherein the processor is operable to track an ascent/descent route of the target vehicle.
7. A control system according to clause 6, wherein the processor is operable to assess one or more terrain characteristics in dependence on the determined vertical offset and the ascent/descent route of the target vehicle.
8. A control system according to clause 6 or clause 7, wherein the processor is operable to calculate a speed of the target vehicle along said ascent/descent route; and optionally to assess one or more terrain characteristics in dependence on the determined speed of the target vehicle.
9. A control system according to any one of the preceding clauses, wherein the signal comprises image data; and the processor is operable to process said image data to identify the target vehicle.
10. A control system according to clause 9, wherein the processor is operable to process said image data to determine a pitch angle and/or a roll angle and/or a yaw angle of the target vehicle.
11. A control system according to any one of the preceding clauses, wherein the processor is operable to determine the vertical offset between the host vehicle and the target vehicle in dependence on a pitch angle and/or a roll angle of the host vehicle.
12. A control system according to any one of the preceding clauses, wherein the processor is operable to output a host vehicle control signal in dependence on the determined vertical offset.
13. A control system according to clause 12, wherein the host vehicle control signal comprises a signal to halt the host vehicle; and/or to set a target speed of the host vehicle.
14. A vehicle comprising a control system according to any one of the preceding clauses.
15. A method of controlling operation of a host vehicle, the host vehicle being a land vehicle; wherein, the method comprising:
    receiving a signal from sensing means;
    processing the signal to identify a target vehicle which is a land vehicle; and
    determining a vertical offset between the host vehicle and the target vehicle.
16. A method according to clause 15 comprising setting a target follow distance between the host vehicle and the target vehicle in dependence on the determined vertical offset between the host vehicle and the target vehicle.
17. A method according to clause 15 or clause 16 comprising determining a rate of change of the determined vertical offset.
18. A method according to clause 17 comprising identifying a base of an incline and/or a crest of an incline in dependence on the rate of change of the determined vertical offset.
19. A method according to clause 17 or clause 18 comprising determining when the rate of change of the vertical offset decreases below a first threshold value; and/or determining when the rate of change of the vertical offset increases above a second threshold value.

20. A method according to any one of clauses 15 to 19 comprising tracking an ascent/descent route of the target vehicle.

21. A method according to clause 20 comprising assessing one or more terrain characteristics in dependence on the determined vertical offset and the ascent/descent route of the target vehicle.

22. A method according to clause 15 or clause 21 comprising estimating a speed of the target vehicle along said ascent/descent route; and optionally assessing one or more terrain characteristics in dependence on the determined speed of the target vehicle.

23. A method according to any one of clauses 15 to 22, wherein the signal comprises image data; and the method comprises processing said image data to identify the target vehicle.

24. A method according to clause 23 comprising processing said image data to determine a pitch angle and/or a roll angle and/or a yaw angle of the target vehicle.

25. A method according to any one of clauses 15 to 24 comprising determining the vertical offset between the host vehicle and the target vehicle in dependence on a pitch angle and/or a roll angle of the host vehicle.

26. A method according to any one of clauses 15 to 25 comprising outputting a host vehicle control signal in dependence on the determined vertical offset.

27. A method according to clause 26, wherein the host vehicle control signal comprises a signal to halt the host vehicle; and/or to adjust a speed of the host vehicle.

28. A non-transitory computer-readable medium having a set of instructions stored therein which, when executed, cause a processor to perform the method according to any one of clauses 15 to 27.

1a. A control system for controlling operation of a host vehicle, the control system comprising a processor operable to:
   track a target vehicle to determine a target vehicle route;
   determine a speed of the target vehicle travelling along the target vehicle route; and
   control a target speed of the host vehicle in dependence on the determined target vehicle speed;
   wherein, in the event that tracking of the target vehicle is interrupted, the processor is operable to control the host vehicle target speed in dependence on the determined target vehicle speed at a known location on the target vehicle route.

2a. A control system according to clause 1a, wherein the known location of the target vehicle corresponds to the location where tracking of the target vehicle was interrupted.

3a. A control system according to clause 1a or clause 2a, wherein the processor is operable to determine an acceleration of the target vehicle along the target vehicle route.

4a. A control system according to clause 3a, wherein the processor to control acceleration of the host vehicle while travelling along the target vehicle route in dependence on the determined acceleration of the target vehicle.

5a. A control system according to any one of the preceding clauses, wherein the processor is operable to determine a trajectory of the target vehicle along the target vehicle route.

6a. A control system according to clause 5a, wherein the processor is operable to control a steering angle of the host vehicle while travelling along the target vehicle route in dependence on the determined trajectory of the target vehicle.

7a. A control system according to any one of the preceding clauses, wherein the processor is operable to receive a signal from at least one sensor provided on the host vehicle and to process said signal to track the target vehicle.

8a. A control system according to clause 7a, wherein the signal comprises image data captured by one or more image sensors; and the processor is operable to process said image data to track the target vehicle.

9a. A control system according to clause 8a, wherein the processor is operable to process said image data to determine a pitch angle and/or a roll angle and/or a yaw angle of the target vehicle.

10a. A vehicle comprising a control system according to any one of the preceding clauses.

11a. A method of controlling operation of a host vehicle, the method comprising:
   tracking a target vehicle to determine a target vehicle route;
   determine a speed of the target vehicle travelling along the target vehicle route;
   controlling a target speed of the host vehicle in dependence on the determined target vehicle speed; and
   in the event that tracking of the target vehicle is interrupted, controlling the host vehicle target speed in dependence on the determined target vehicle speed at a known location on the target vehicle route.

12a. A method according to clause 11a, wherein the known location of the target vehicle corresponds to the location where tracking of the target vehicle was interrupted.

13a. A method according to clause 11a or clause 12a comprising determining an acceleration of the target vehicle along the target vehicle route.

14a. A method according to clause 13a comprising controlling acceleration of the host vehicle while travelling along the target vehicle route in dependence on the determined acceleration of the target vehicle.

15a. A method according to any one of clauses 11a to 14a comprising determining a trajectory of the target vehicle along the target vehicle route.

16a. A method according to clause 15a comprising controlling a steering angle of the host vehicle while travelling along the target vehicle route in dependence on the determined trajectory of the target vehicle.

17a. A method according to any one of clauses 11a to 15a comprising receiving a signal from at least one sensor provided on the host vehicle and processing said signal to track the target vehicle.

18a. A method according to clause 17a, wherein the signal comprises image data captured by one or more image sensors; and the method comprises processing said image data to track the target vehicle.

19a. A method according to clause 18a comprising processing said image data to determine a pitch angle and/or a roll angle and/or a yaw angle of the target vehicle.

20a. A control system for controlling operation of a host vehicle, the control system comprising a processor operable to:
   track a target vehicle to determine a target vehicle route;
   determine a trajectory of the target vehicle along the target vehicle route; and
   control a target speed of the host vehicle in dependence on the determined target vehicle speed;
   wherein the processor is operable to control a steering angle of the host vehicle while the host vehicle is travelling along the target vehicle route in dependence on the determined trajectory of the target vehicle.

21a. A control system according to clause 20a, wherein, in the event that tracking of the target vehicle is interrupted, the processor is operable to control the steering angle of the host vehicle in dependence on the determined trajectory of the target vehicle at a known location on the target vehicle route.

22a. A method of controlling operation of a host vehicle, the method comprising:
tracking a target vehicle to determine a target vehicle route;
determining a trajectory of the target vehicle along the target vehicle route; and
controlling a target speed of the host vehicle in dependence on the determined target vehicle speed;
wherein a steering angle of the host vehicle is controlled while the host vehicle is travelling along the target vehicle route in dependence on the determined trajectory of the target vehicle.

23a. A method according to clause 22a, wherein, in the event that tracking of the target vehicle is interrupted, the method comprises controlling the steering angle of the host vehicle in dependence on the determined trajectory of the target vehicle at a known location on the target vehicle route.

24a. A non-transitory computer-readable medium having a set of instructions stored therein which, when executed, cause a processor to perform the method according to any one of clauses 11 a to 19a, 22a and 23a.

1b. A control system for controlling operation of a host vehicle, the host vehicle being a land vehicle; wherein the control system comprises:
a processor operable to track a target vehicle and generate a target vehicle trace;
correlate a host vehicle location and/or a host vehicle trajectory with the target vehicle trace; and
output a deviation signal for controlling a vehicle control module upon determination that the correlation between the host vehicle location and/or the host vehicle trajectory and the target vehicle trace exceeds a predefined deviation threshold.

2b. A control system according to clause 1b, wherein the processor is configured to output a correlation signal for controlling the vehicle control module upon determination that the correlation between the host vehicle location and/or the host vehicle trajectory and the target vehicle trace is within the predefined deviation threshold.

3b. A control system for controlling operation of a host vehicle, the host vehicle being a land vehicle; the control system comprising:
a processor operable to track a target vehicle and generate a target vehicle trace;
correlate a host vehicle location and/or a host vehicle trajectory with the target vehicle trace; and
output a correlation signal for controlling a vehicle control module upon determination that the correlation between the host vehicle location and/or the host vehicle trajectory and the target vehicle trace is within the predefined deviation threshold.

4b. A control system according to any one of clauses 1 b, 2b or 3b, wherein the host vehicle trajectory is determined in dependence on a steering angle of the host vehicle.

5b. A control system according to any one of clauses 1 b to 4b, wherein the predefined deviation threshold comprises a divergence angle between a trajectory of the host vehicle and a trajectory of the target vehicle defined in the target vehicle trace.

6b. A control system according to any one of the preceding clauses, wherein the predefined deviation threshold comprises a distance between a current location of the host vehicle and a location of the target vehicle defined in the target vehicle trace.

7b. A control system according to any one of the preceding clauses, wherein the processor is operable to receive a signal from at least one sensor provided on the host vehicle, the processor being operable to process said signal to generate the target vehicle trace.

8b. A control system according to clause 7b, wherein the signal comprises image data captured by one or more image sensors; and the processor is operable to process said image data to generate the target vehicle trace.

9b. A control system according to clause 7b or clause 8b, wherein the signal comprises data captured by one or more of the following types of sensor: a LIDAR sensor; a Radar sensor and an ultrasonic sensor.

10b. A vehicle comprising a control system according to any one of the preceding clauses.

11b. A method of controlling operation of a host vehicle, the host vehicle being a land vehicle; wherein the method comprises:
tracking a target vehicle and generating a target vehicle trace; and
correlating a location and/or a trajectory of the host vehicle with the target vehicle trace; and
outputting a deviation signal if the correlation between the host vehicle location and/or the host vehicle trajectory and the target vehicle trace exceeds a predefined deviation threshold.

12b. A method according to clause 11b, comprising outputting a correlation signal for controlling the vehicle control module upon determination that the correlation between the host vehicle location and/or the host vehicle trajectory and the target vehicle trace is within the predefined deviation threshold.

13b. A method of controlling operation of a host vehicle, the host vehicle being a land vehicle; wherein the method comprises:
tracking a target vehicle and generating a target vehicle trace; and
correlating a location and/or a trajectory of the host vehicle with the target vehicle trace; and
outputting a correlation signal for controlling the vehicle control module upon determination that the correlation between the host vehicle location and/or the host vehicle trajectory and the target vehicle trace is within the predefined deviation threshold.

14b. A method according to any one of clauses 11b, 12b or 13b comprising determining the host vehicle trajectory in dependence on a steering angle of the host vehicle.

15b. A method according to any one of clauses 11 b to 14b, wherein the predefined deviation threshold comprises a divergence angle between a trajectory of the host vehicle and a trajectory of the target vehicle defined in the target vehicle trace.

16b. A method according to any one of clauses 11 b to 15b, wherein the predefined deviation threshold comprises a distance between a current location of the host vehicle and a location of the target vehicle defined in the target vehicle trace.

17b. A method according to any one of clauses 11 b to 16b comprising receiving a signal from at least one sensor provided on the host vehicle and processing said signal to generate the target vehicle trace.

18b. A method according to clause 17b, wherein the signal comprises image data captured by one or more image sensors; and the image data is processed to generate the target vehicle trace.

19b. A non-transitory computer-readable medium having a set of instructions stored therein which, when executed, cause a processor to perform the method according to any one of clauses 11 b to 18b.

The invention claimed is:

1. A control system for controlling operation of a host vehicle, the host vehicle being a land vehicle; wherein the control system comprises:
a processor for receiving a signal from a sensor, the processor being operable to:
process the signal to identify a target vehicle which is a land vehicle;
determine a vertical offset between the host vehicle and the target vehicle, the vertical offset being indicative of a height of the target vehicle above or below an elevation of the host vehicle;
adjust a target follow distance between the host vehicle and the target vehicle dynamically in dependence on the determined vertical offset between the host vehicle and the target vehicle; and
control a speed of the host vehicle to maintain the adjusted target follow distance;
wherein the processor is operable to determine a rate of change of the determined vertical offset;
wherein the processor is operable to determine when the rate of change of the vertical offset decreases below a first threshold value; or to determine when the rate of change of the vertical offset increases above a second threshold value; and
wherein the processor is configured to estimate a location at which a slope begins in dependence on the rate of change of determined vertical offset, and to determine, in dependence on a steepness of the gradient of the slope, whether to follow the target vehicle onto the slope, or to wait at a base or a crest of the slope until either a driver confirmation to proceed is received or automatically in response to it being established that the target vehicle has cleared the base or the crest of the slope.

2. A control system as claimed in claim 1, wherein the processor is operable to identify the base of the slope and/or the crest of the slope in dependence on the rate of change of the determined vertical offset.

3. A control system as claimed in claim 1, wherein the processor is operable to track an ascent/descent route of the target vehicle.

4. A control system as claimed in claim 3, wherein the processor is operable to calculate a speed of the target vehicle along said ascent/descent route.

5. The control system as defined in claim 4, wherein the processor is operable to assess one or more terrain characteristics in dependence on the determined speed of the target vehicle.

6. A control system as claimed in claim 1, wherein the processor is operable to:
determine the vertical offset between the host vehicle and the target vehicle in dependence on a pitch angle and/or a roll angle of the host vehicle, and/or
output a host vehicle control signal in dependence on the determined vertical offset.

7. A control system as claimed in claim 6, wherein the host vehicle control signal comprises a signal to halt the host vehicle and/or to set a target speed of the host vehicle.

8. The control system as defined in claim 1, wherein the processor is operable to assess one or more terrain characteristics in dependence on the determined vertical offset and the ascent/descent route of the target vehicle.

9. A vehicle comprising a control system as claimed in claim 1.

10. A method of controlling operation of a host vehicle, the host vehicle being a land vehicle; wherein, the method comprising:
receiving a signal from a sensor;
processing the signal to identify a target vehicle which is a land vehicle;
determining a vertical offset between the host vehicle and the target vehicle, the vertical offset being indicative of a height of the target vehicle above or below an elevation of the host vehicle;
adjusting a target follow distance between the host vehicle and the target vehicle dynamically in dependence on the determined vertical offset between the host vehicle and the target vehicle; and
controlling a speed of the host vehicle to maintain the adjusted target follow distance,
wherein the method further comprises estimating a location at which a slope begins in dependence on the rate of change of determined vertical offset, and determining, in dependence on a steepness of the gradient of the slope, whether to follow the target vehicle onto the slope, or to wait at a base or a crest of the slope until either a driver confirmation to proceed is received or automatically in response to it being established that the target vehicle has cleared the base or the crest of the slope.

11. A non-transitory computer-readable medium having a set of instructions stored therein which, when executed, cause a processor to perform the method claimed in claim 10.

* * * * *